US012332581B2

(12) United States Patent
Shimada

(10) Patent No.: US 12,332,581 B2
(45) Date of Patent: Jun. 17, 2025

(54) IMAGE FORMATION APPARATUS HAVING DEVELOPER CARTRIDGE WITH ROTATABLE SHUTTER LOCK ENGAGEMENT MEMBER

(71) Applicant: Oki Electric Industry Co., Ltd., Tokyo (JP)

(72) Inventor: Shingo Shimada, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 22 days.

(21) Appl. No.: 18/413,712

(22) Filed: Jan. 16, 2024

(65) Prior Publication Data

US 2024/0280926 A1 Aug. 22, 2024

(30) Foreign Application Priority Data

Feb. 17, 2023 (JP) ................................ 2023-023646

(51) Int. Cl.
*G03G 15/08* (2006.01)

(52) U.S. Cl.
CPC ..... *G03G 15/0886* (2013.01); *G03G 15/0875* (2013.01); *G03G 2215/068* (2013.01); *G03G 2215/0692* (2013.01)

(58) Field of Classification Search
CPC ........... G03G 15/0886; G03G 15/0875; G03G 21/1676; G03G 21/1817; G03G 21/1821; G03G 2215/068; G03G 2215/0692; G03G 2221/1853
USPC .................................... 399/262; 222/DIG. 1
See application file for complete search history.

(56) References Cited

U.S. PATENT DOCUMENTS 5,614,996 A * 3/1997 Tanda ................ G03G 15/0868 141/363
2006/0104673 A1* 5/2006 Sasae ................ G03G 15/0868 399/262
2012/0076549 A1* 3/2012 Fujii ................. G03G 21/1676 399/262
2013/0170868 A1* 7/2013 Acosta .............. G03G 21/1821 399/258
2016/0313671 A1* 10/2016 Eto .................... G03G 15/0886
2017/0108800 A1* 4/2017 Sato ................... G03G 15/0886
2020/0233337 A1* 7/2020 Yoshida ............. G03G 15/0875
2024/0142895 A1* 5/2024 Minamoto ......... G03G 15/0886

FOREIGN PATENT DOCUMENTS

JP 2021-96422 A 6/2021

* cited by examiner

*Primary Examiner* — Robert B Beatty
(74) *Attorney, Agent, or Firm* — METROLEX IP LAW GROUP, PLLC; Robert L. Scott, Esq.

(57) ABSTRACT

An image formation unit according to an embodiment may include: an image formation part with a developer reception port; a developer cartridge including: a developer storage section with a developer supply port; a shutter movable between an open position and a closed position; a lock engagement member; and an operation part configured to be operated to move the shutter and rotate the lock engagement member. When the shutter moves from the open position to the closed position that closes the developer supply port and the lock engagement member rotates in conjunction with movement of the operation part, the lock engagement member is engaged with the image formation part to separate the developer cartridge from a peripheral portion of the developer reception port.

13 Claims, 17 Drawing Sheets

(LOCKED STATE)

(LOCK RELEASED STATE)

(PULLOUT START POSITION)

(PULLOUT START POSITION)

(MID-PULLOUT STATE)

INSERTION END POSITION)

(MIDDLE OF TRANSITIONING TO LOCKED STATE)

(LOCKED STATE)

IMAGE FORMATION APPARATUS HAVING DEVELOPER CARTRIDGE WITH ROTATABLE SHUTTER LOCK ENGAGEMENT MEMBER

CROSS REFERENCE TO RELATED APPLICATIONS

This application claims priority based on 35 USC 119 from prior Japanese Patent Application No. 2023-023646 filed on Feb. 17, 2023, entitled “IMAGE FORMATION UNIT AND IMAGE FORMATION APPARATUS”, the entire contents of which are incorporated herein by reference.

BACKGROUND

The disclosure may relate to an image formation unit and an image formation apparatus.

There has been an apparatus that includes an image formation part configured to form an image by an electrophotographic process and a developer cartridge that is detachably attached to the image formation part (for example, see Patent Document 1).

Patent Document 1: Japanese Patent Application Publication No. 2021-096422

SUMMARY

However, when the developer cartridge is removed from the image formation part, developer particles that are adhered to a periphery of a developer supply port of the developer cartridge and that are adhered to a periphery of the developer reception port of the image formation part may be scattered around.

An object of an embodiment of the disclosure may be to provide an image formation unit and an image formation apparatus that are capable of suppressing a developer from scattering when a developer cartridge is removed from an image formation part.

An aspect of the disclosure may be an image formation unit that may include: an image formation part including a developer reception port and configured to form a developer image with a developer; and a developer cartridge including: a storage section that stores therein the developer; a developer supply port provided at the storage section; a shutter movable between an open position that opens the developer supply port and a closed position that closes the developer supply port; a lock engagement member rotatably provided with respect to the storage section; and an operation part configured to be operated to move the shutter and rotate the lock engagement member. The developer is supplied from the storage section to the developer reception port through the developer supply port, in a state where the developer cartridge is installed to the image formation part such that the developer supply port overlaps with the developer reception port, the developer cartridge contacts a peripheral portion of the developer reception port, and the shutter is in the open position. When the shutter moves from the open position to the closed position in conjunction with a movement of the operation part and the lock engagement member rotates in conjunction with the movement of the operation part, the lock engagement member is engaged with the image formation part and the developer cartridge is separated from the peripheral portion of the developer reception port.

According to the aspect described above, it may be possible to suppress the developer from scattering when the developer cartridge is removed from the image formation part.

DETAILED DESCRIPTION

Figure 1:
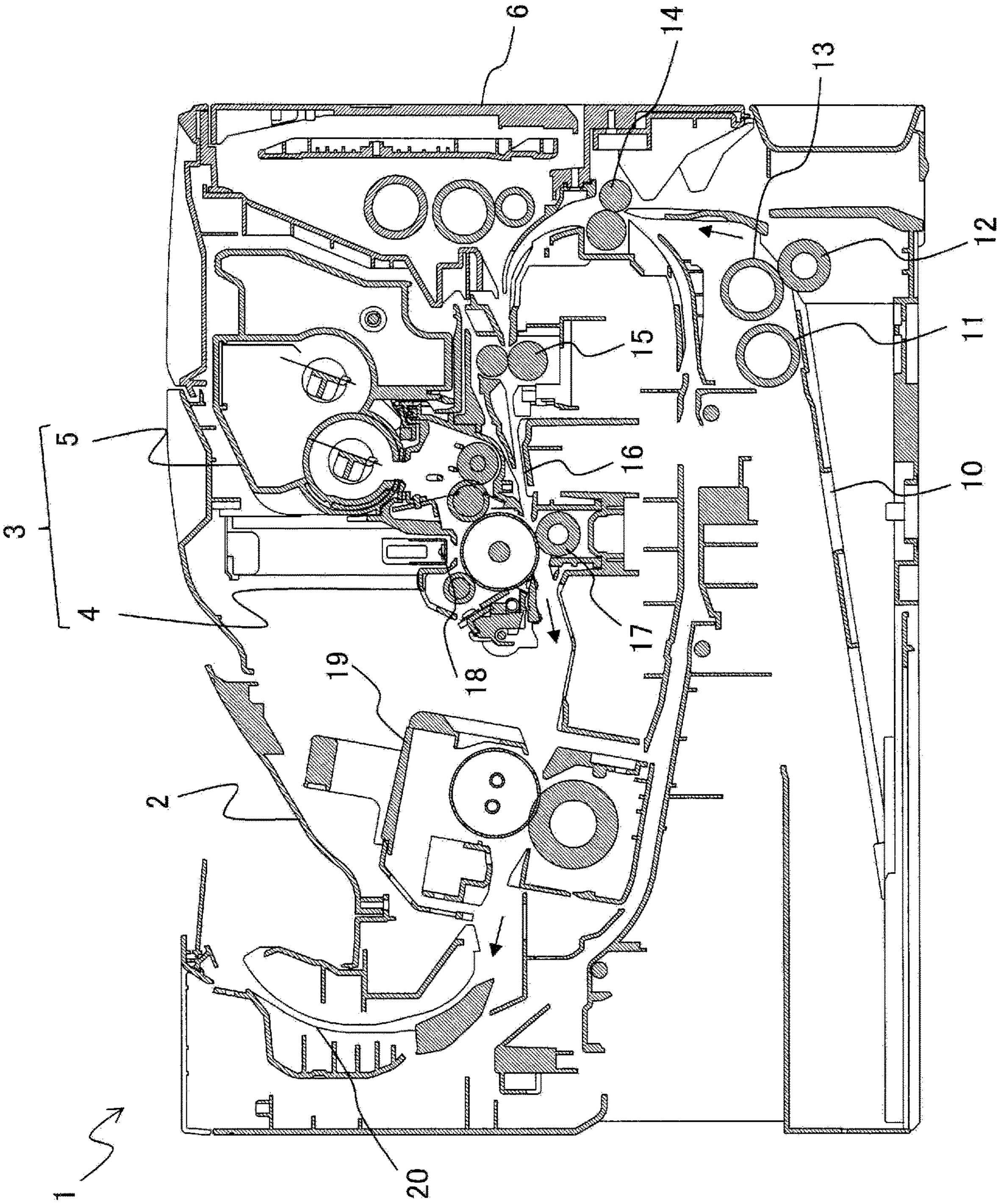
FIG. 1 is a diagram of a cross sectional view illustrating a structure of an image formation apparatus according to an embodiment.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

An image formation unit and an image formation apparatus according to one or more embodiments are described below with reference to the drawings. The following one or more embodiments are merely examples, and various changes and modifications care possible within the scope of the disclosure.

A basic structure of the image formation unit is the same on left and right sides (that is, at both longitudinal ends of the developer cartridge). Therefore, only one of the left and right sides of the image formation unit may be illustrated and explained for avoid redundancies. Although it is preferable that the structure of the image formation unit be the same on the left and right sides, it may be possible to employ different structures on the left and right sides of the image formation unit. The letters "L" and "R" at the ends of the reference signs indicate the components of the image formation unit are provided on the left side and the right side. Note that the components of the image formation unit that are provided both on the left and right side in an embodiment may be provided only on one of the left side and right side.

(Image Formation Apparatus 1)

Figure 2:
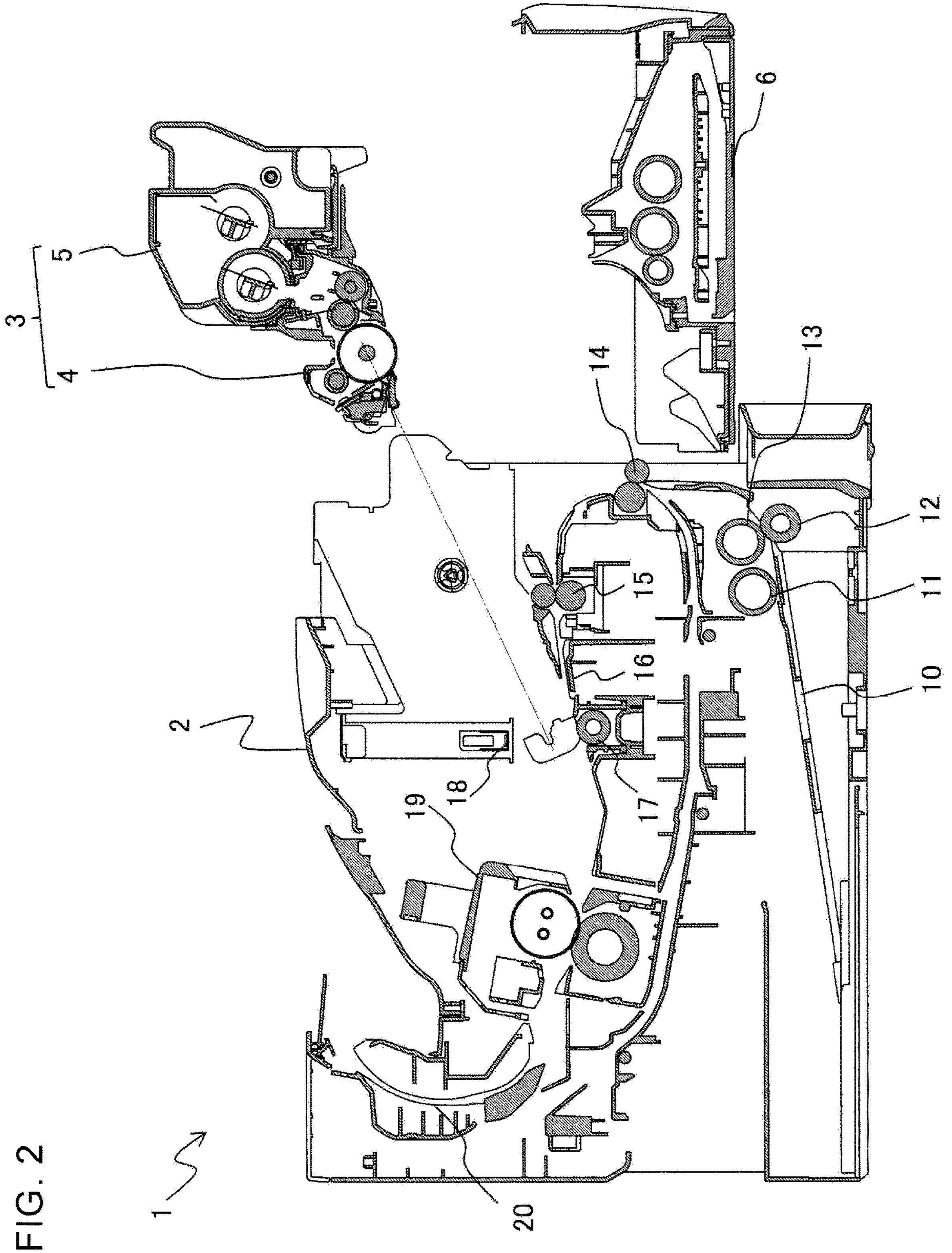
FIG. 2 is a diagram of a cross sectional view illustrating the structure of the image formation apparatus in a state where a front cover is opened and an image formation unit is removed.
Figure 3:
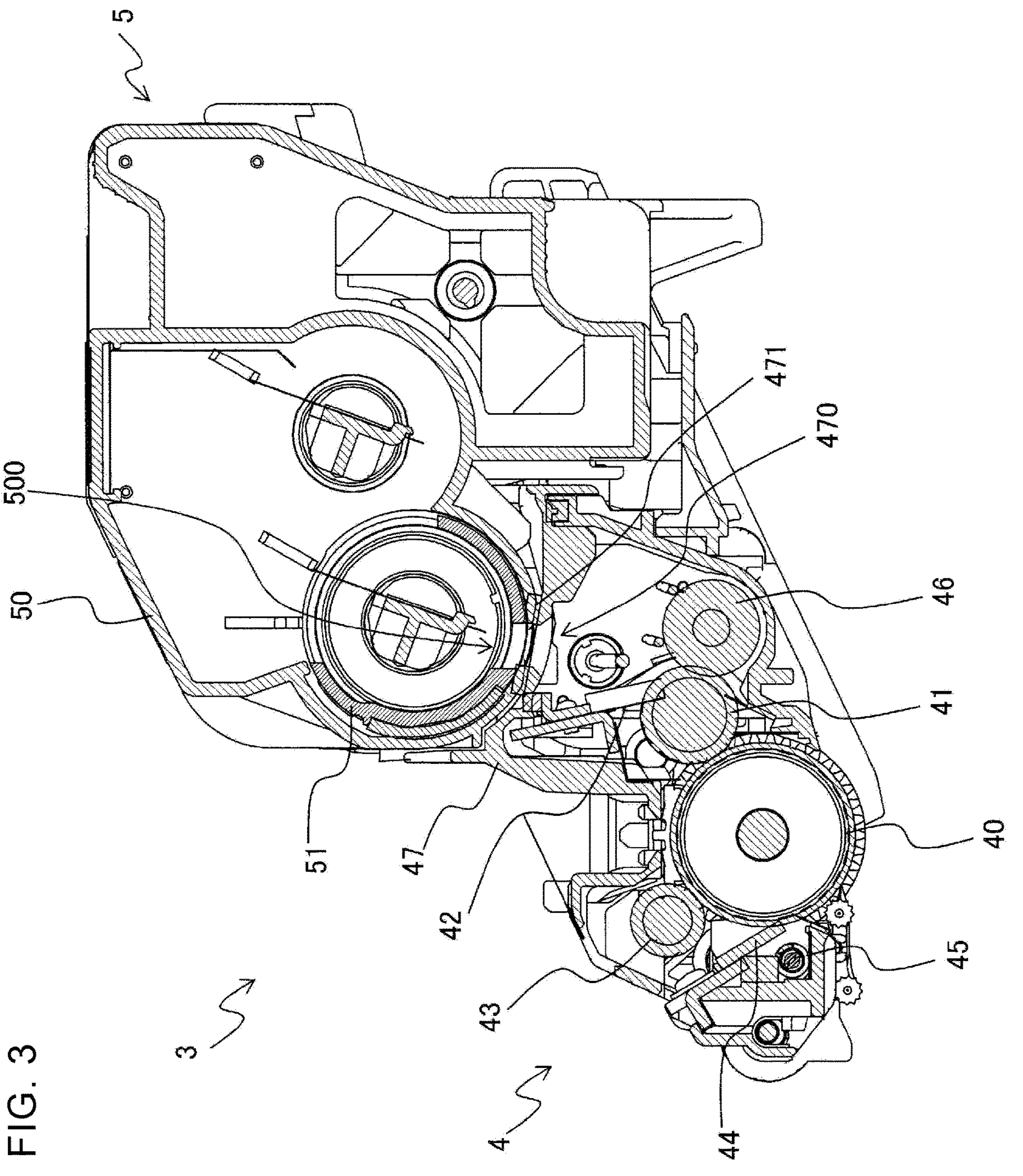
FIG. 3 is a diagram of a cross sectional view illustrating a structure of the image formation unit according to an embodiment.

FIG. 1 is a diagram of a cross sectional view illustrating a structure of an image formation apparatus 1 according to an embodiment. FIG. 2 is a diagram of a cross sectional view illustrating the structure of the image formation apparatus 1 in a state where a front cover 6 is opened approximately 90 degrees to the front of the image formation apparatus and an image formation unit 3 is removed from the image formation apparatus. FIG. 3 is a diagram of a cross sectional view illustrating the structure of the image formation unit 3.

In an embodiment, the image formation apparatus 1 is the printer configured to form an image on a printing medium such as paper using an electrophotographic process. The image formation apparatus 1 includes an image formation unit 3 serving as a printing mechanism. The image formation unit 3 is configured to be detachable from a main body (a housing 2) of the image formation apparatus 1. The image formation apparatus 1 may be a color printer having a plurality of image formation units 3. The front cover 6 is attached to the main body of the image formation apparatus 1 so as to be openable and closable with respect to the main body.

The image formation unit 3 is a printing mechanism that forms a developer image (a toner image) using, for example, black developer (black toner). However, the color of the developer is not limited to black. The image formation unit 3 includes a drum unit 4 as an image formation part (an image formation device), and a developer cartridge (a toner cartridge) 5 as a developer container that is detachably attached to the drum unit 4.

A lower portion of the inside of the housing 2 of the image formation apparatus 1 is provided with: a medium cassette 10 configured to store therein printing media, a pickup roller 11 configured to feed out the printing media stored in the media cassette 10 one by one, and a pair of rollers including a retard roller 12 and a conveyance roller 13 configured to correct a skew of the printing medium (i.e. the state in which the paper is fed diagonally). The inside of the housing 2 of the image formation apparatus 1 is also provided with: a pair of conveyance rollers 14 and a pair of conveyance rollers 15 configured to convey the printing medium along a conveyance path 16; the conveyance path 16 that guides the printing medium, and an optical head 18 serving as an exposure device; a transfer roller 17 serving as a transfer part or a transfer member configured to transfer a developer image (a toner image) formed by the image formation unit 3 onto the printing medium; a fixation device 19 configured to heat and pressurize the developer image on the printing medium to fix the developer image to the printing medium; and a conveyance path 20 for discharging the printing medium that has passed through the fixation device 19 to the outside of the housing 2. The optical head 18 is, for example, a light emitting element (LED) array head or a laser scanning device. The inside of the housing 2 of the image formation apparatus 1 is also provided with a plurality of unillustrated medium sensors configured to detect a passage of the printing medium, and an unillustrated conveyance roller(s) configured to convey the printing medium.

The drum unit 4 serving as the image formation part includes a charging roller 43 serving as a charging member, a photosensitive drum 40 serving as an image carrier a surface of which is configured to be uniformly charged by the charging roller 43, and a development roller 41 serving as a development member, a development blade 42 serving as a layer formation blade, a supply roller 46 serving as a developer supplying member, a cleaning blade 44 serving as a cleaning member, and a waste developer conveyance member 45. The development roller 41, the development blade 42, and the supply roller 46 constitute a development unit or a development device configured to supply the developer onto the photosensitive drum 40 so as to develop an electrostatic latent image on the photosensitive drum 40 formed by the optical head 18.

Image data is input to the optical head 18 of the image formation unit 3. In the image formation unit 3, the optical head 18 emits light based on the image data to expose the uniformly charged surface of the photosensitive drum 40 with the emitted light to thereby form the electrostatic latent image on the surface of the photosensitive drum 40.

The developer supplied from the developer cartridge 5 into a development chamber 47 is strongly rubbed by the supply roller 46 and the development roller 41 and is triboelectrically charged. The developer is supplied to the development roller 41 via the supply roller 46, is made into a thin layer on the development roller 41 by the development blade 42, and is conveyed to a contact portion between the photosensitive drum 40 and the development roller 41.

The developer on the development roller 41 is transferred onto the photosensitive drum 40 by electrostatic force, so as to form (develop) a developer image corresponding to the electrostatic latent image on the photosensitive drum 40. The transfer roller 17 is arranged below the photosensitive drum 40 of the image formation unit 3. The transfer roller 17 transfers the developer image from the photosensitive drum 40 onto the printing medium that is being conveyed between the photosensitive drum 40 and the transfer roller 17. While the printing medium having the developer image transferred thereon passes through the fixation device 19, the fixation device 19 fixes the developer image onto the printing medium.

(Image Formation Unit 3)

Figure 4:
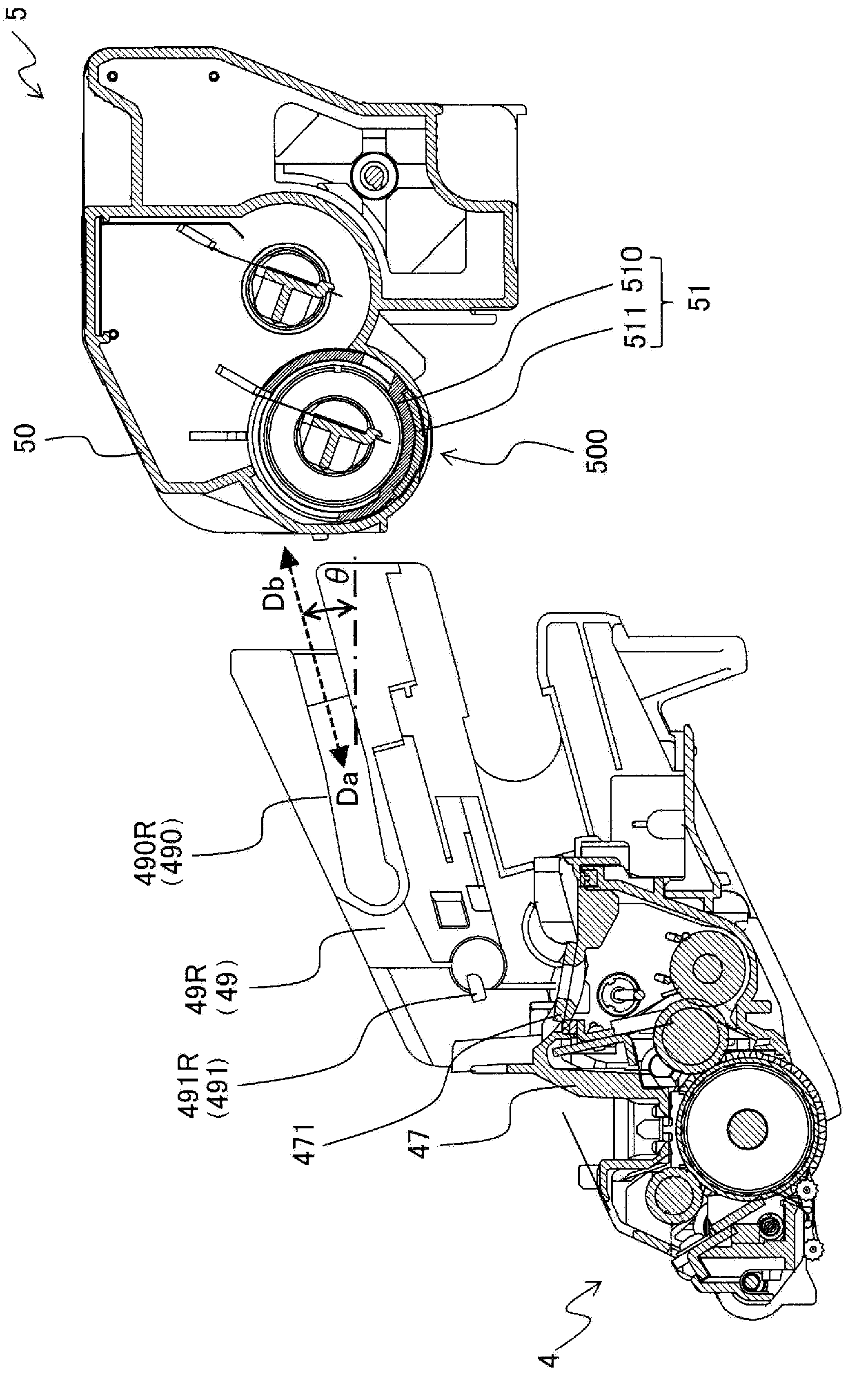
FIG. 4 is a diagram of a cross sectional view illustrating the image formation unit illustrated in FIG. 3 including a drum unit (image formation part) and a developer cartridge in a state where the developer cartridge is installed (mounted) to the drum unit.
Figure 5:
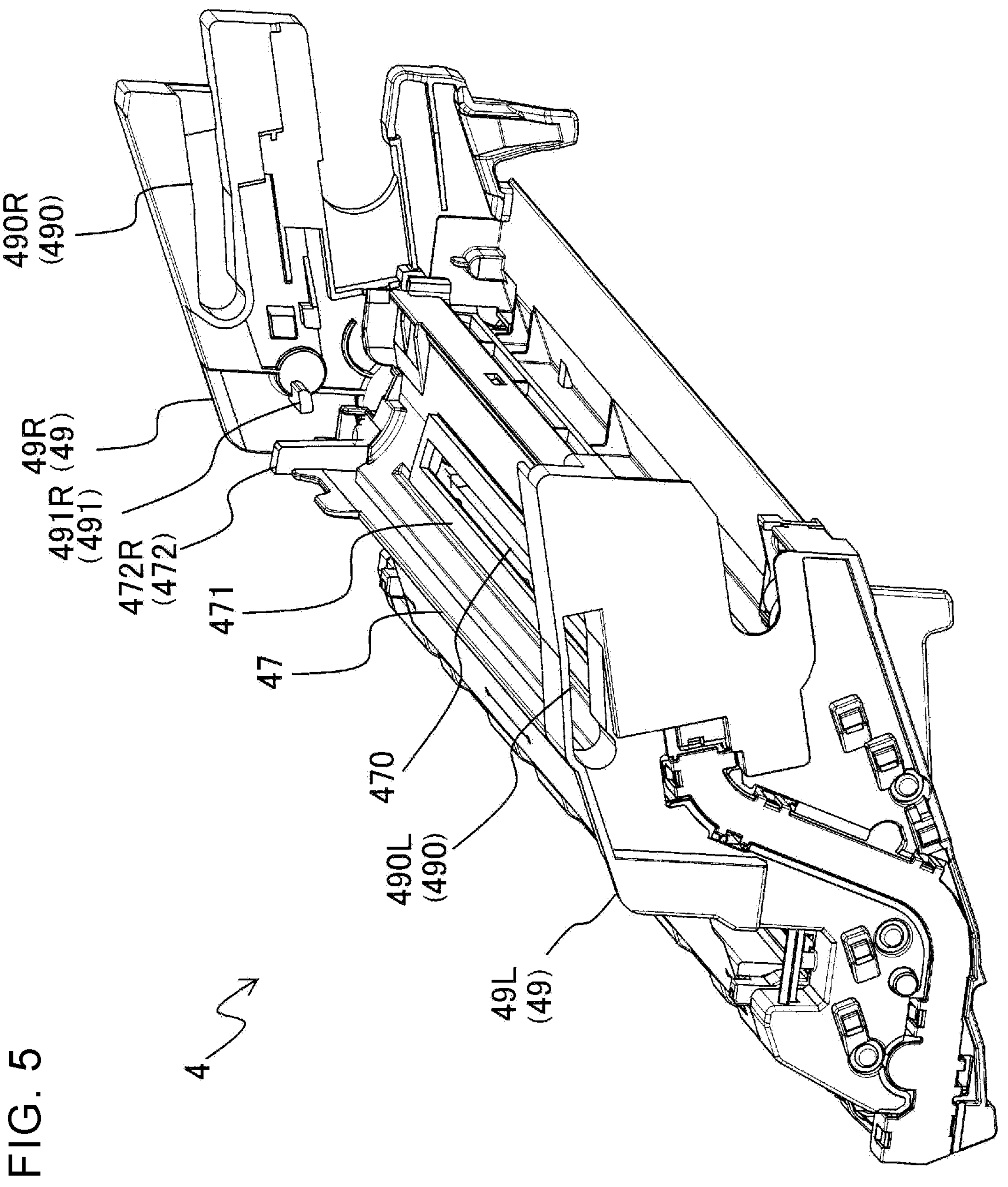
FIG. 5 is a diagram of a perspective view illustrating the drum unit (image formation part) of the image formation unit illustrated in FIG. 3.
Figure 6:
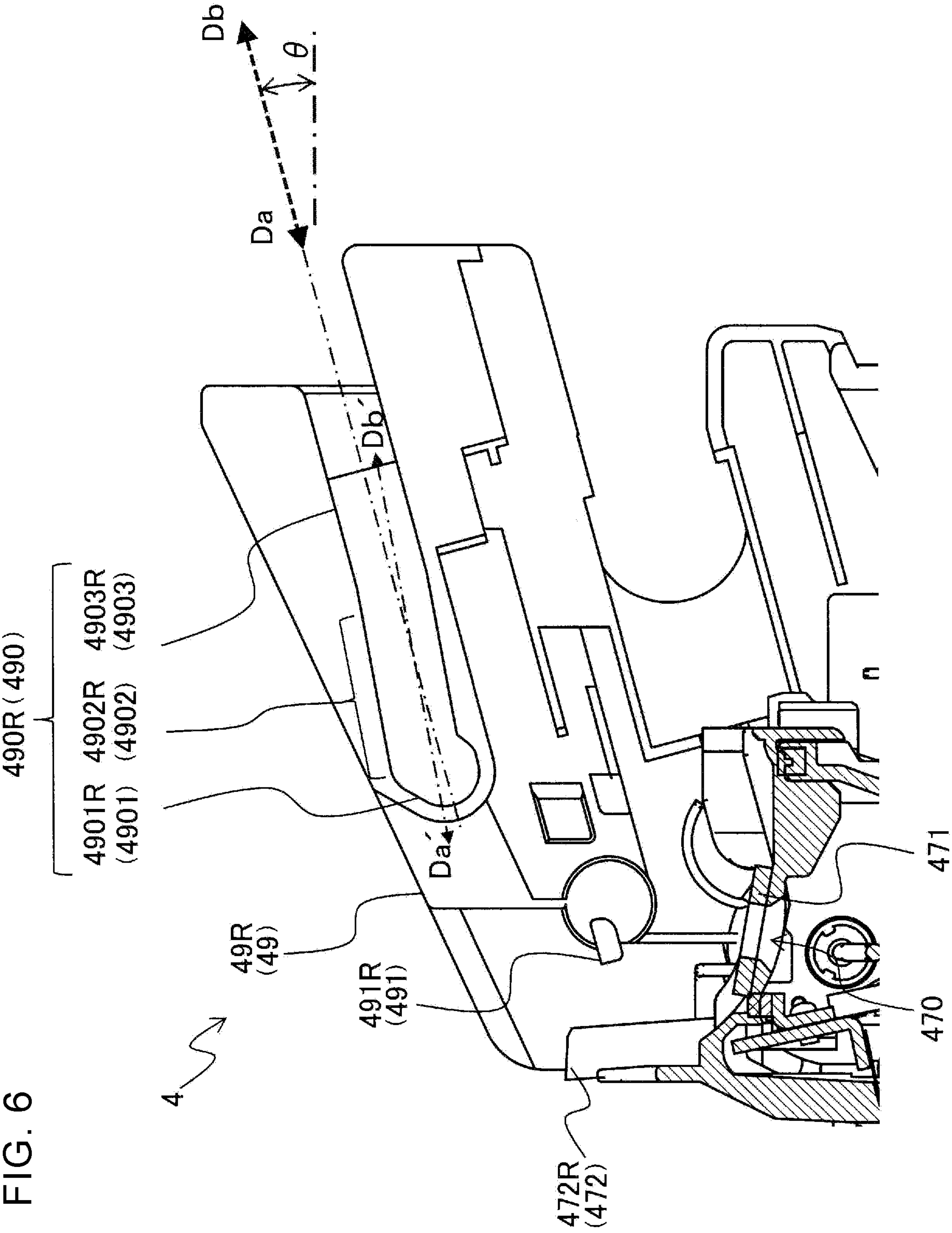
FIG. 6 is a diagram of a cross sectional view illustrating a vicinity of a guide groove of the drum unit (image formation part) of the image formation unit illustrated in FIG. 3.

FIG. 4 is a diagram illustrating a cross sectional view of the drum unit 4 and the developer cartridge 5 of the image formation unit 3, with the developer cartridge 5 being detached from the drum unit 4. FIG. 5 is a diagram illustrating a perspective view of the drum unit 4 of the image formation unit 3. FIG. 6 is a diagram of a cross sectional view illustrating the vicinity of a guide groove 490R (490) of the drum unit 4 of the image formation unit 3.

The image formation unit 3 illustrated in FIG. 4 includes the drum unit 4 as the image formation part (the image formation device) and the developer cartridge 5 as the developer container. The developer cartridge 5 is installed (mounted) at a predetermined position on the drum unit 4. When the developer in the developer cartridge 5 is used up, the user removes the developer cartridge 5 from the drum unit 4 and attaches a new developer cartridge 5 to the drum unit 4.

In an embodiment, the developer cartridge 5 is inserted in an insertion direction Da and pulled out in a pullout direction Db at a predetermined angle θ (for example, 15°) with respect to the drum unit 4 (that is, with respect to the horizontal direction of the image formation apparatus 1), so as to be attached to and detached from the drum unit 4.

The drum unit 4 includes a photosensitive drum 40, a development roller 41, a development blade 42, a charging roller 43, a cleaning blade 44, a waste developer transport member 45, a supply roller 46, a development chamber 47, and left and right side frames 49 (right side frame 49R (see FIG. 5), left side frame 49L (see FIG. 5)). The development chamber 47 includes: a developer reception port 470 to receive the developer supplied from the developer cartridge 5; a seal member 471 formed of an elastic member such as a sponge or the like; and support portions 472 that engage with lock engagement members 512. Note that regarding the support portions 472, the support portion 472R on the right side is illustrated but the support portion on the left side is not illustrated in FIGS. 5 and 6. Also, regarding the lock engagement members 512, the lock engagement member 512L on the left side is illustrated but the lock engagement member on the right side is not illustrated in FIGS. 7 to 10B. The sealing member 471 is a peripheral part disposed around the developer reception port 470 and surrounding the developer reception port 470.

The side frames 49 on the left and right sides of the drum unit 4 each include a guide groove 490 (guide groove 490R on the right side (see FIGS. 4 to 6), guide groove 490L on the left side (see FIG. 5)) extending in the insertion direction Da and the pullout direction Db (the insertion direction Da' and the pullout direction Db' in the second groove part), and a lock engagement post 491 (lock engagement post 491R on the right side (see FIGS. 4 to 6), engagement post 491L on the left side lock (see FIGS. 15A, 15D, 15G)) as a third engagement portion. Each of the guide grooves 490 on the left side and the right side includes a third groove portion 4903 (third groove portion 4903R on the right side (see FIG. 6), third groove portion 4903L on the left side (see FIG. 12)) extending parallel to the insertion direction Da and the pullout direction Db of the developer cartridge 5, a second groove portion 4902 (second groove portion 4902R on the right side (see FIG. 6), second groove portion on the left side (see FIG. 12)) extending in the direction Da' and the pullout direction Db' the inclinations of which are less than that of the insertion direction Da and the pullout direction Db, and a first groove portion 4901 (first groove portion 4901R on the right side (see FIG. 6), first groove portion 4901L on the left side (see FIG. 12)) extending downward toward the downstream side of the insertion direction. As illustrated in FIG. 6, an inclination angle of the insertion direction Da' with respect to the horizontal direction is smaller than that of the insertion direction Da.

Figure 7:
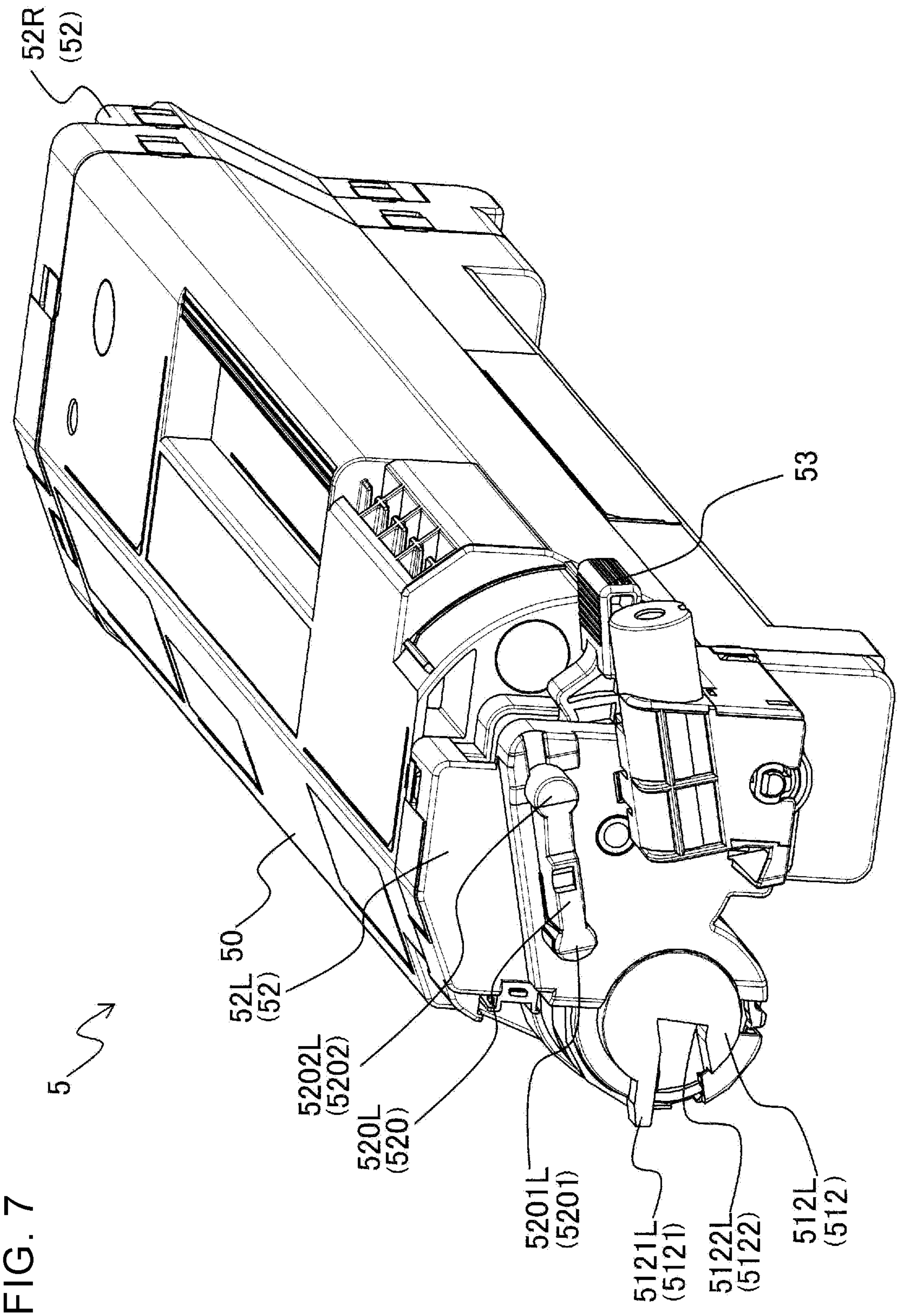
FIG. 7 is a diagram of a perspective view of an appearance of the developer cartridge as viewed diagonally from above.
Figure 8:
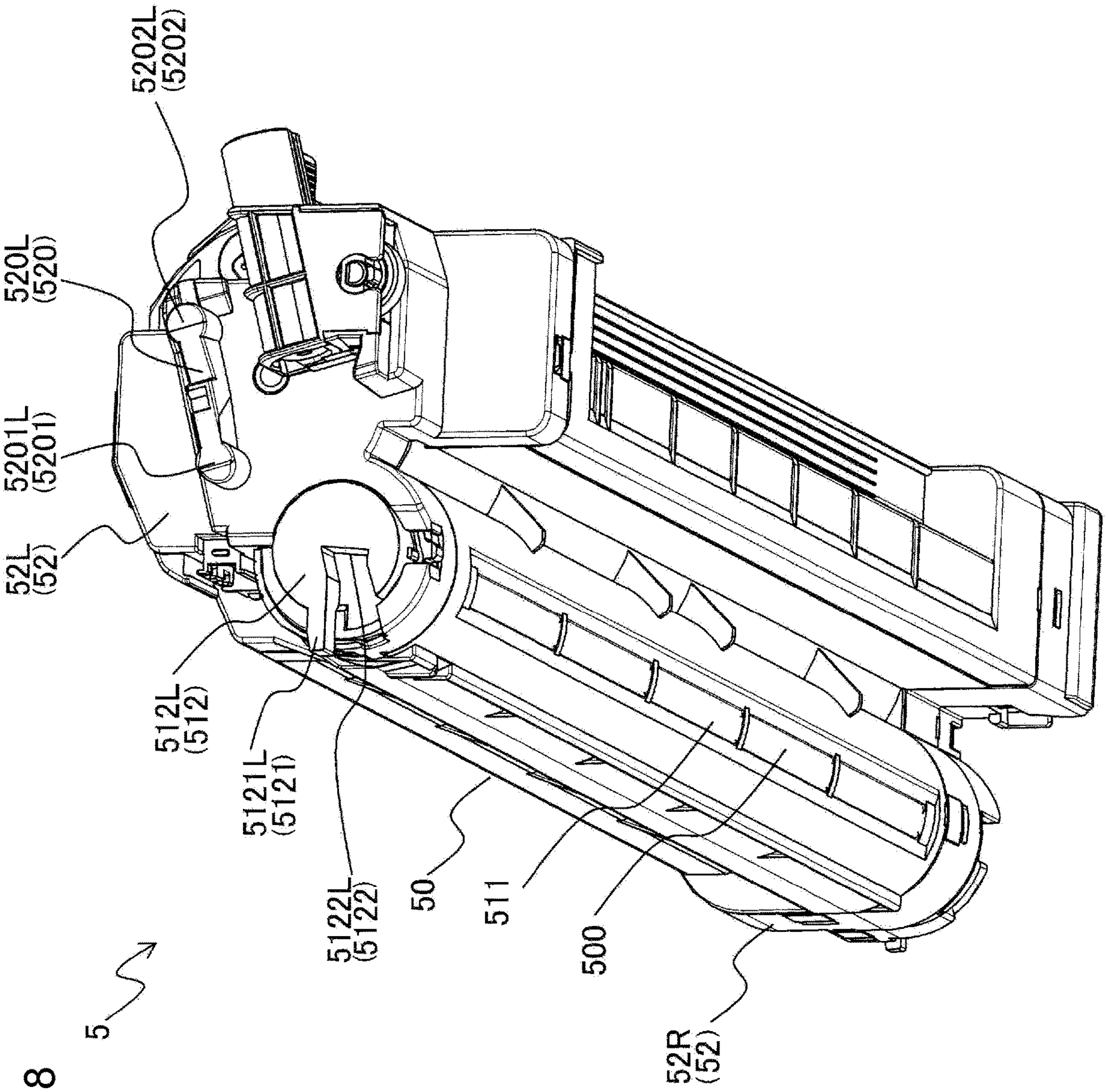
FIG. 8 is a diagram of a perspective view of an appearance of the developer cartridge as viewed diagonally from below.
Figure 9:
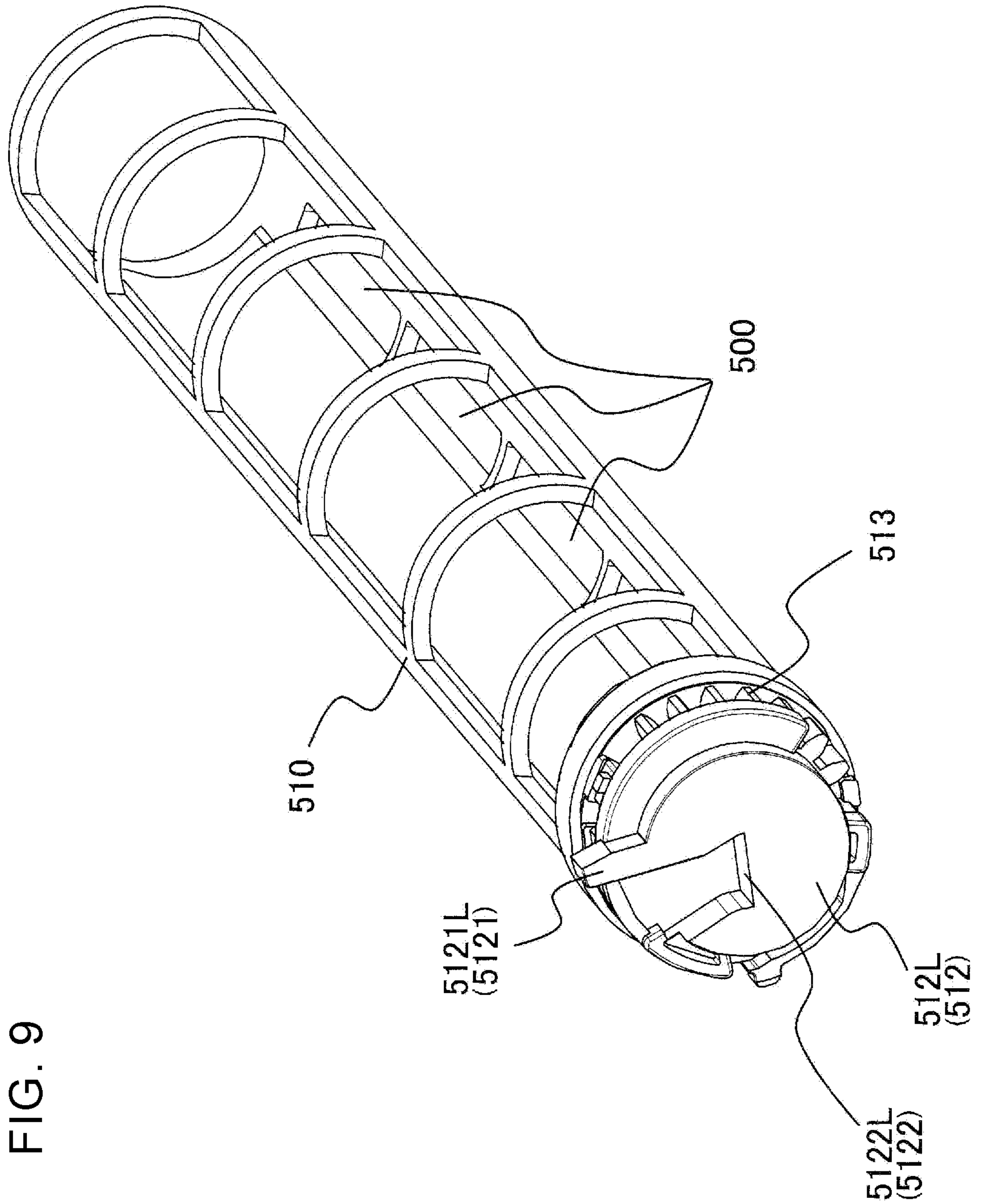
FIG. 9 is a diagram of a perspective view illustrating a lock engagement member (a rotation member) of the developer cartridge.
Figure 10B:
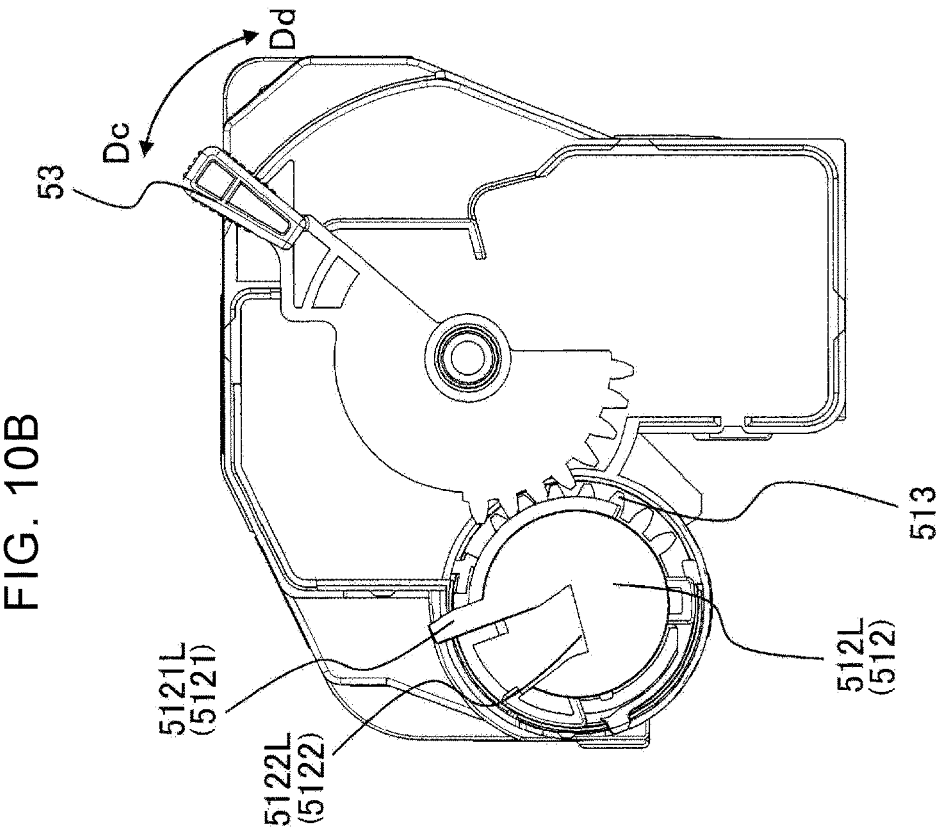
FIG. 10B is a diagram of a side view illustrating the lock engagement member of the developer cartridge when the shutter is in an open position.
Figure 10A:
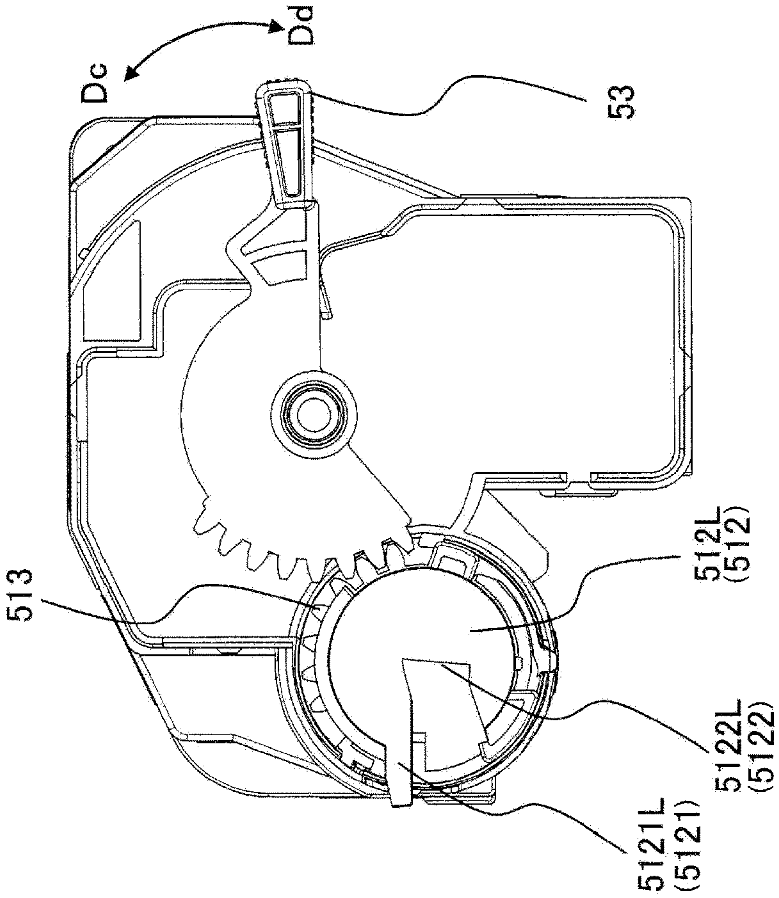
FIG. 10A is a diagram of a side view illustrating the lock engagement member of the developer cartridge when the shutter is in a closed position.
Figure 11C:
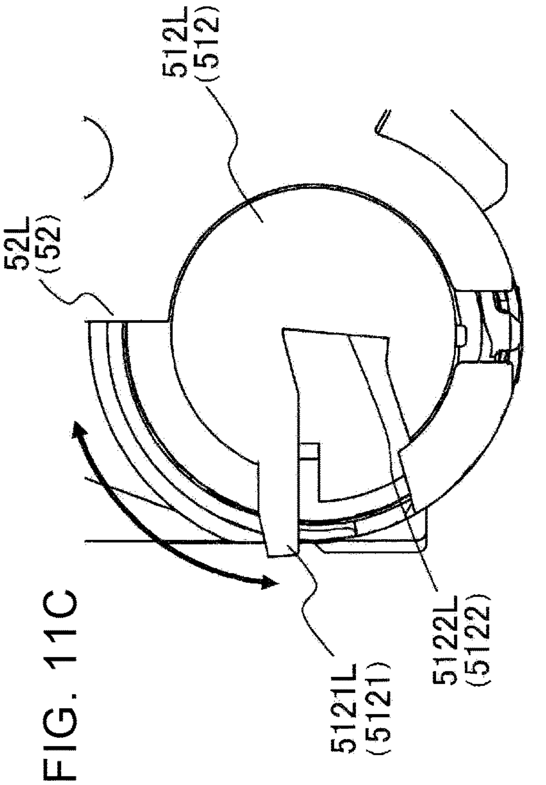
FIG. 11C is a diagram of a side view illustrating the lock engagement member of the developer cartridge when the shutter is in the closed position.

FIG. 7 is a diagram of a perspective view illustrating an appearance of the developer cartridge 5 as viewed diagonally from above. FIG. 8 is a diagram of a perspective view of an appearance of the developer cartridge 5 as viewed diagonally from below. FIG. 9 is a diagram of a perspective view illustrating a lock engagement member 512L (a rotation member) of the developer cartridge 5. FIG. 10A is a side view illustrating an operation lever 53 and the lock engagement member 512L of the developer cartridge 5 when a shutter 51 is in the closed position and FIG. 10B is a side view illustrating the operation lever 53 and the lock engagement member 512L of the developer cartridge 5 when the shutter 51 is in the open position. FIG. 11A is a side view illustrating the lock engagement member 512L of the developer cartridge 5 when the shutter 51 is in the open position and FIG. 11B is a cross sectional view illustrating the shutter 51 of the developer cartridge 5 when the shutter 51 is in the open position. FIG. 11C is a side view illustrating the lock engagement member 512L of the developer cartridge 5 when the shutter 51 is in the closed position and FIG. 11B is a cross sectional view illustrating the shutter 51 of the developer cartridge 5 when the shutter 51 is in the closed position. Although only the lock engagement member 512L on the left side is illustrated in FIG. 9, the lock engagement member on the right side (illustration thereof being omitted) is provided on the opposite side from the left side lock engagement member 512L.

The developer cartridge 5 includes a storage portion 50, the shutter 51, left and right side frames 52 (left side frame 52L (see FIG. 7), right side frame 52R (see FIG. 7), and an operation lever 53. The storage portion 50, which is a main body of the developer cartridge 5, stores therein developer. The storage portion includes a developer supply port 500 on a lower surface thereof.

Figure 11D:
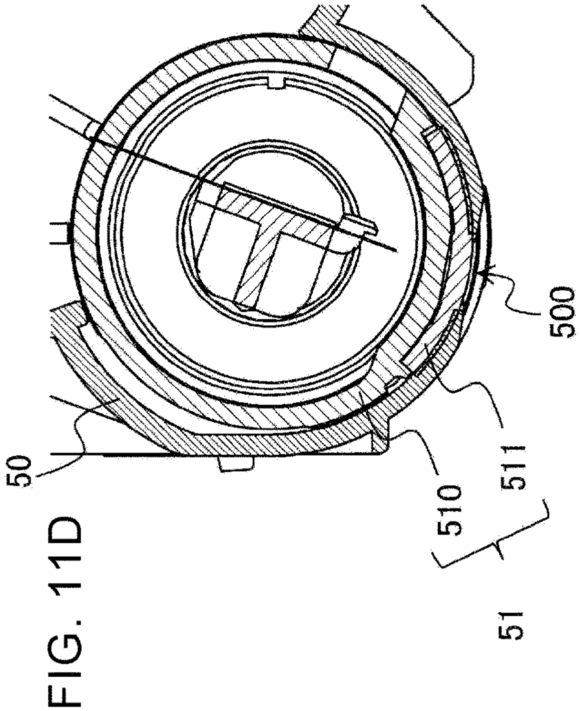
FIG. 11D is a diagram of a cross sectional view illustrating the shutter of the developer cartridge when the shutter is in the closed position.
Figure 11A:
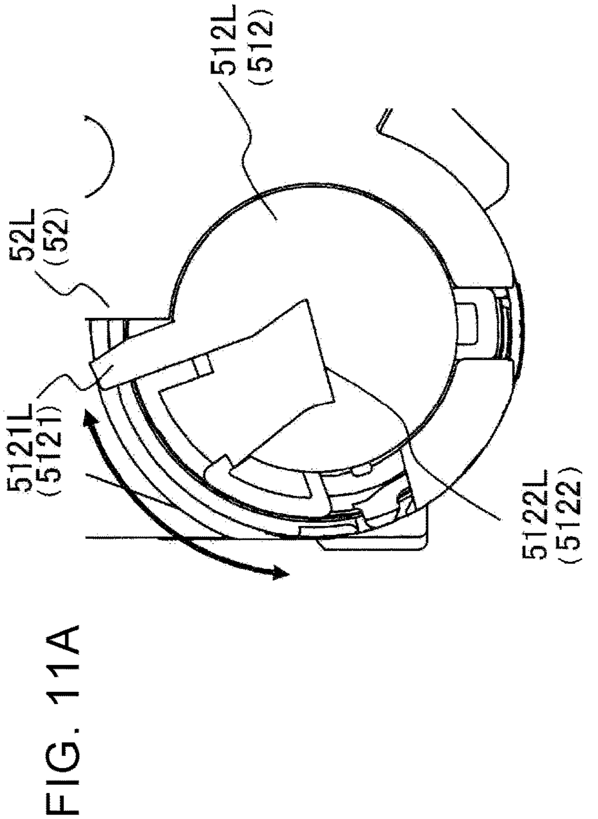
FIG. 11A is a diagram of a side view illustrating the lock engagement member of the developer cartridge when the shutter is in the open position.
Figure 11B:
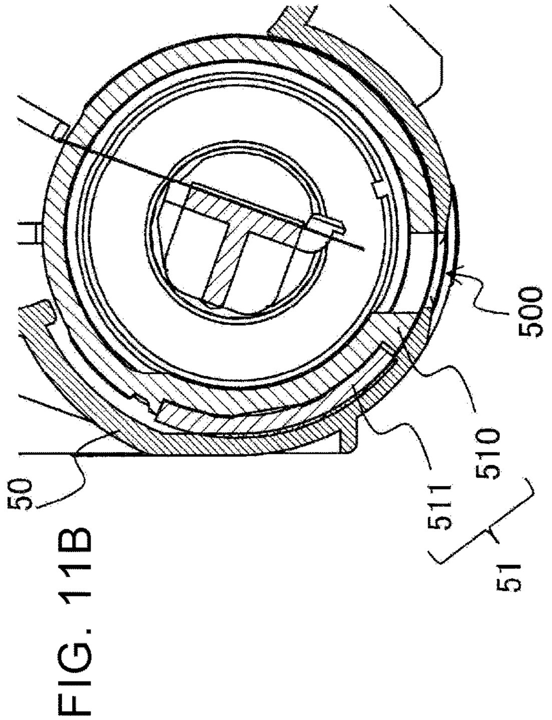
FIG. 11B is a diagram of a cross sectional view illustrating the shutter of the developer cartridge when the shutter is in the open position.

The shutter 51 is rotatably supported by the side frames 52 (52L, 52R) of the developer cartridge 5, such that the shutter 51 is movable between a locked position illustrated in FIGS. 11A and 11B and a developer cartridge pullout position (TC pullout position) illustrated in FIGS. 11C and 11D. The shutter 51 includes an inner cylinder portion 510 and a seal portion 511 made of an elastic member such as sponge. In an embodiment, the shutter 51 includes lock engagement members 512 on the left side and the right side (the lock engagement member 512L on the left side is illustrated but the lock engagement member on the right side is not illustrated in the figures). Each of the lock engagement members 512 is formed with a protrusion 5121 (only the protrusion 5121L on the left side is illustrated and the protrusion on the right side is not illustrated in the figures) serving as a first engagement portion, and a groove 5122 (only the left side groove 5122L is illustrated and the right side groove is not illustrated in the figures) serving as a second engagement portion. When the shutter 51 is in the lock position, an opening provided at the inner cylinder portion 510 is located at a position overlapping the developer supply port 500, and thus the developer supply port 500 is opened, that is, the developer supply port 500 is in an open state. When the shutter 51 is in the TC pullout position, the seal portion 511 is in a position to cover the developer supply port 500 so that the developer supply port 500 is shielded and is thus in a closed state. The rotation of the shutter 51 is linked to the movement (e.g., the rotation) operation of the operation lever 53 illustrated in FIGS. 10A and 10B. The shutter 51 is configured to transition to the locked position or the pullout position by moving the operation lever 53.

Each of the side frames 52 of the developer cartridge 5 includes a guide rib 520 as a guide member. Note that among the guide ribs 520 on the left and right sides, only the left side guide rib 520L is illustrated and the right side guide rib is not illustrated in the figures. Each of the guide ribs 520 includes a tail end side guide portion 5202 thereof at the upstream end portion in the insertion direction Da of the developer cartridge 5, and a leading end side guide portion 5201 thereof at the downstream end portion in the insertion direction D1 of the developer cartridge 5. Note that among the tail end side guide portions 5202 on the left and right sides, the tail end side guide portion 5202L on the left side is illustrated and the tail end side guide portion on the right side is not illustrated in the figures. Also, among the front end guide portions on the left and right sides, only the leading end side guide portion 5201L on the left side is illustrated and the leading end side guide portion on the right side is not illustrated in the figures.

The developer cartridge 5 is attached to the drum unit 4 such that the developer supply port 500 overlaps the developer reception port 470 and the developer cartridge 5 contacts the sealing member 471 provided at the peripheral part of the developer reception port 470. In the state where the shutter 51 is in the open position, the developer is supplied from the storage portion 50 to the developer reception port 470 through the developer supply port 500. Further, when the shutter 51 moves from the open position to the closed position in conjunction with the movement of the operation lever 53 serving as the operation part and the lock engagement members 512 (only 512L illustrated) moves in conjunction with the movement of the operation lever 53, the lock engagement members 512 (only 512L illustrated) engage with the drum unit 4 so that the developer cartridge 5 is lifted and the developer cartridge 5 is separated from the seal member 471 of the drum unit 4. In other words, in conjunction with the movement of the operation lever 53 serving as the operation part, the lock engagement members 512 (only 512L illustrated) engage with the drum unit 4 and the developer cartridge 5 separates from the seal member 471 of the drum unit 4.

(Removal of Developer Cartridge)

Figure 12:
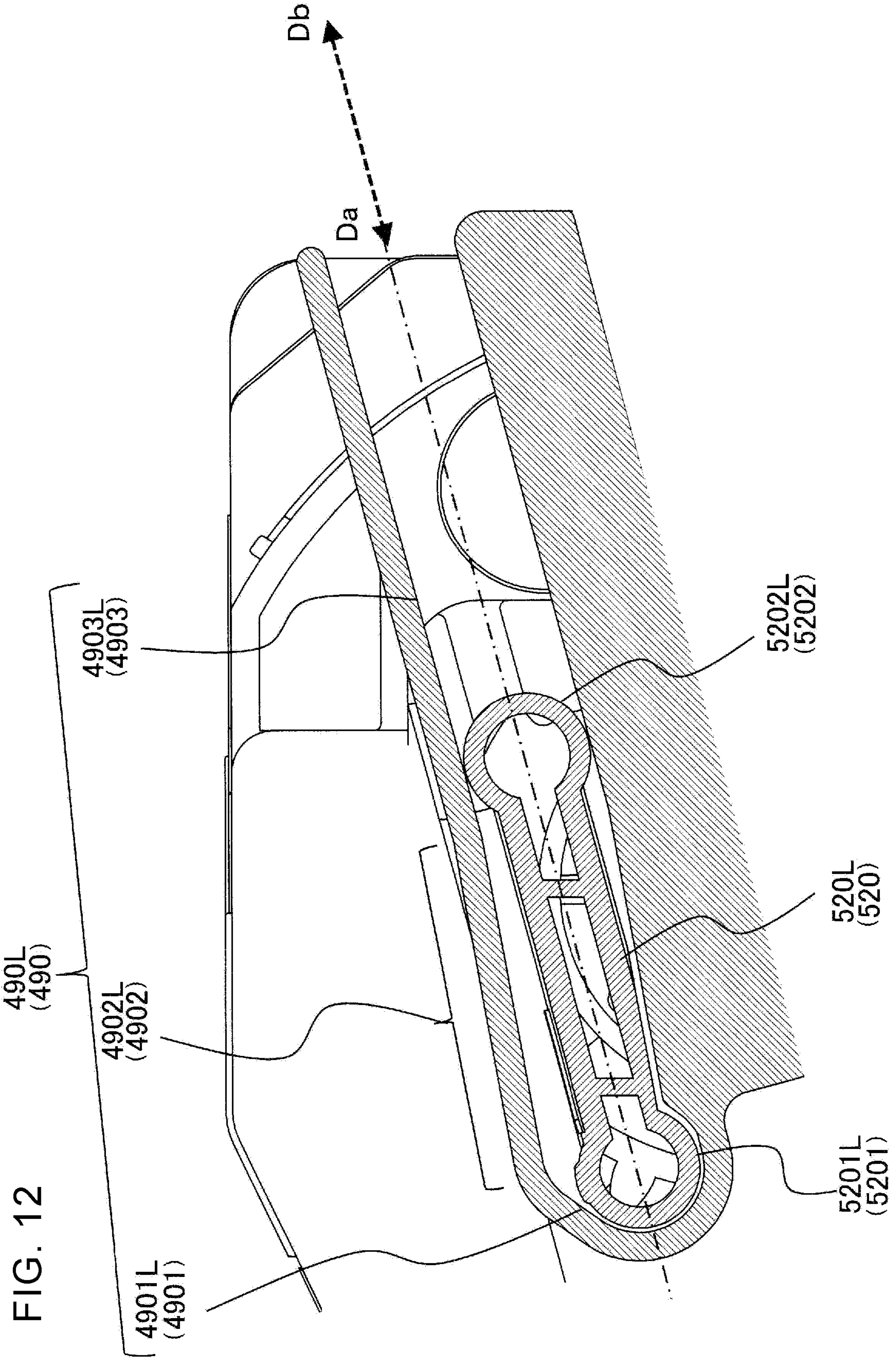
FIG. 12 is a diagram of a cross-sectional view illustrating the guide groove of a main body (image formation part) of the image formation unit and a guide rib of the developer cartridge when the developer cartridge is installed and in a locked state.
Figure 13A:
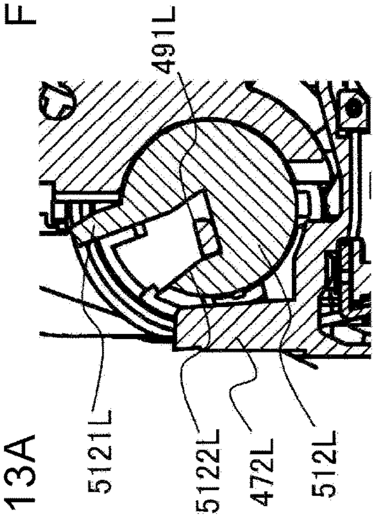
FIGS. 13A, 13B, and 13C are a side view, a cross sectional view, and a cross sectional view respectively illustrating the lock engagement member, the shutter, and the guide rib when the developer cartridge is in the installed position and in the locked state.
Figure 13D:
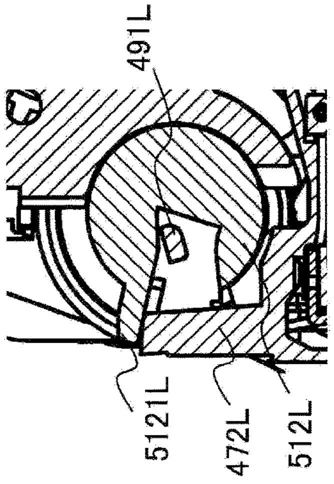
FIGS. 13D, 13E, and 13F are a side view, a cross-sectional view, and a cross sectional view that respectively illustrate the lock engagement member, the shutter, and the guide rib when the developer cartridge is in the installed position and in an unlocked state.
Figure 13G:
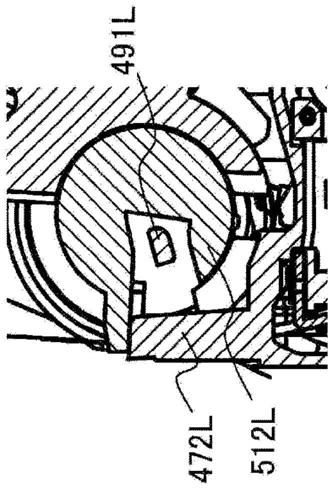
FIGS. 13G, 13H, and 13I are a side view, a cross-sectional view, and a cross sectional view that respectively illustrate the lock engagement member, the shutter, and the guide rib in a state where the developer cartridge is lifted.
Figure 13B:
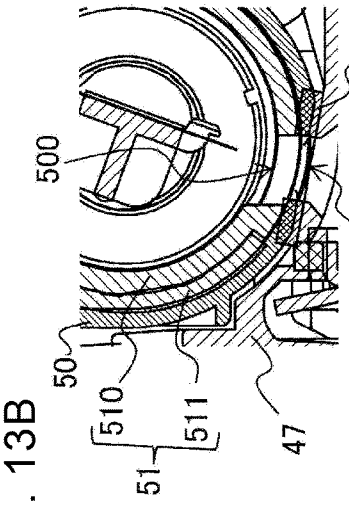
Figure 13E:
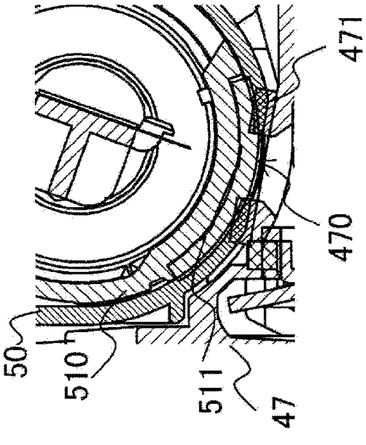
Figure 13H:
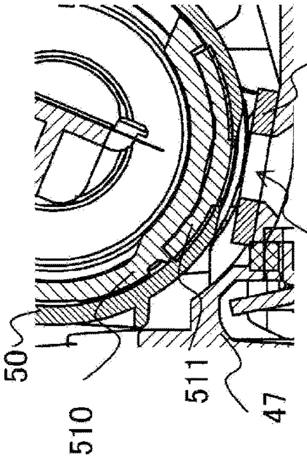
Figure 13C:
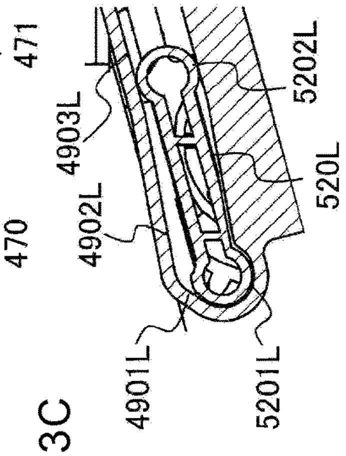
Figure 13F:
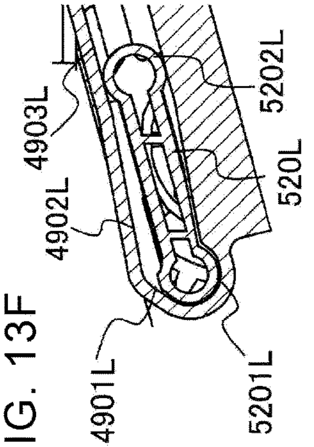
Figure 13I:
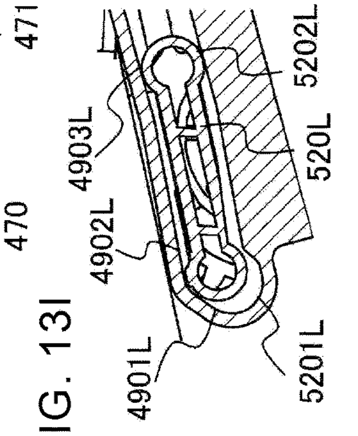

Next, an operation of removing the developer cartridge 5 from the drum unit 4 is explained with reference to FIGS. 12 to 13I. Note that in FIGS. 12 to 14D, components on the left side are only illustrated, but the components on the right side are same as the components on the left side and thus the components on the right side and the operations of the components on the right side are not illustrated or explained for avoid redundancies. FIG. 12 is a diagram of a cross sectional view illustrating the guide groove 490L of the drum unit 4 of the image formation unit 3 and the guide rib 520L of the developer cartridge 5 in the state where the developer cartridge 5 is installed and locked. FIGS. 13A, 13B, and 13C are a side view, a cross-sectional view, and a cross-sectional view respectively illustrating the lock engagement member 512L, the shutter 51, and the guide rib 520L when the developer cartridge 5 is in the installed position and in the locked state. FIGS. 13D, 13E, and 13F are a side view, a cross-sectional view, and a cross-sectional view respectively illustrating the lock engagement member 512L, the shutter 51, and the guide rib 520L when the developer cartridge 5 is in the installed position and in the unlocked state. FIGS. 13G, 13H, and 13I are a side view, a cross-sectional view, and a cross-sectional view respectively illustrating the lock engagement member 512L, the shutter 51, and the guide rib 520L when the developer cartridge 5 is in the pullout start position, that is, when the developer cartridge 5 is in the lifted state.

When the developer cartridge 5 is installed (mounted) to the drum unit 4, that is, when the shutter 51 is in the locked position, the image formation unit 3 is in the locked state illustrated in FIGS. 12 and 13A, 13B, and 13C. In this state, the groove 5122L of the lock engagement member 512L and the lock engagement post 491L of the side frame 49L contact and engage with each other, and the developer cartridge 5 is in contact with the seal member 471 of the drum unit 4. At this time, the first groove portion 4901L is restricted from moving upward, and the leading end side guide portion 5201L is located within the range of the first groove portion 4901L, the rear end guide portion 5202L is located at the downstream end portion of the third groove portion 4903L in the insertion direction Da. That is, at this time, since the groove 5122L and the lock engagement post 491L are engaged with each other, the developer cartridge 5 is fixed so that the developer cartridge 5 cannot move relative to the drum unit 4. In this state, the developer cartridge 5 is in contact with the sealing member 471 surrounding the developer supply port 500 with the sealing member 471 being compressed, and the developer supply port 500 is in communication with the developer reception port 470 so as to allow the developer to be supplied from the developer cartridge 5 into the drum unit 4.

When the shutter 51 is rotated from the locked state toward the unlocked position (TC pullout position) in conjunction with movement of the operation lever 53, the components are positioned as illustrated in FIGS. 13D, 13E, and 13F, in which the protrusion 5121L of the engagement member 512L is in contact with the support portion 472L of the cover of the development chamber 47. In this state, the developer cartridge 5 and the sealing member 471 remain in contact with each other, and the developer supply port 500 is covered and shielded by the sealing member 511, that is, the developer supply port 500 is in the closed state, so that the developer in the developer cartridge 5 is not supplied to the outside.

When the shutter 51 is further rotated toward the TC pullout position in conjunction with further movement of the operation lever 53, the protrusion 5121L of the lock engagement member 512L is in contact with the support portion 472L of the development chamber 47, so that a force is generated in the direction of moving the developer cartridge 5 upward. Thus, the leading end side guide portion 5201L move upward while being guided by the first groove portion 4901L, so that a portion of the developer cartridge 5 on the shutter 51 side moves upward with respect to a portion of the developer cartridge 5 on the operation lever 53 side and thus the developer cartridge 5 is lifted up as illustrated in FIGS. 13G, 13H, and 13I.

In the state where the shutter 51 is rotated to the TC pullout position, the developer cartridge 5 is separated from the sealing member 471, the leading end side guide portion 5201L is located at a position between the third groove portion 4903L and the second groove portion 4902L, and thus the developer cartridge 5 can be pulled out from the drum unit 4 in the pullout direction Db' and then in the pullout direction Db (illustrated in FIG. 6).

Figure 14A:
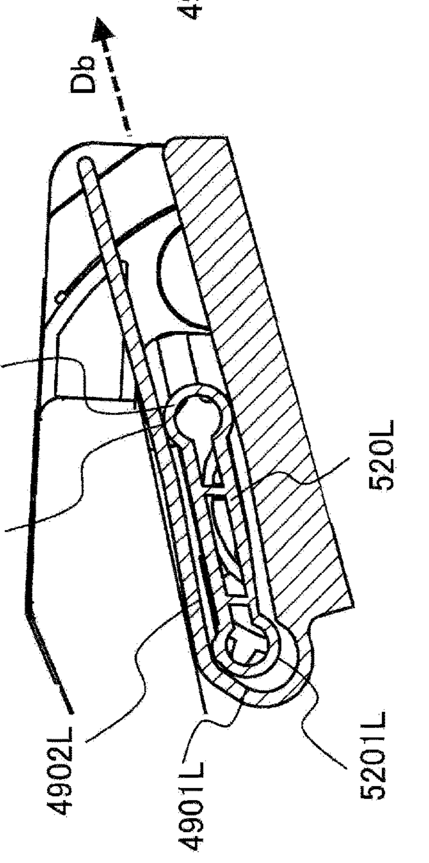
FIGS. 14A and 14B are cross-sectional views respectively illustrating the guide rib and a vicinity of the shutter when the developer cartridge is in a pullout start position.
Figure 14B:
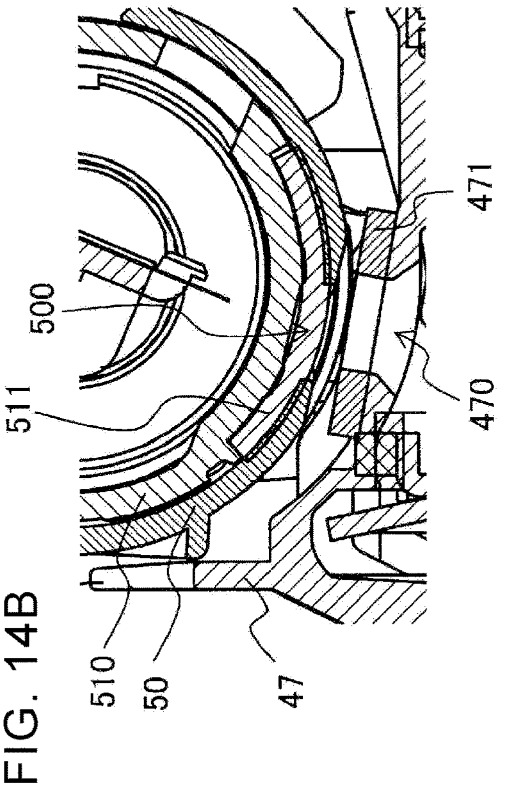
Figure 14C:
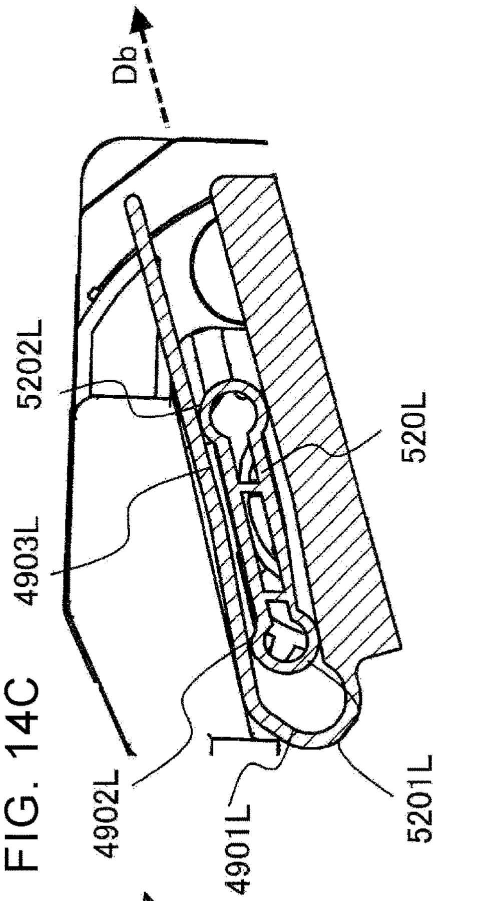
FIGS. 14C and 14D are cross-sectional views respectively illustrating the guide and the vicinity of the shutter when the developer cartridge is in a middle of being pulled out.
Figure 14D:
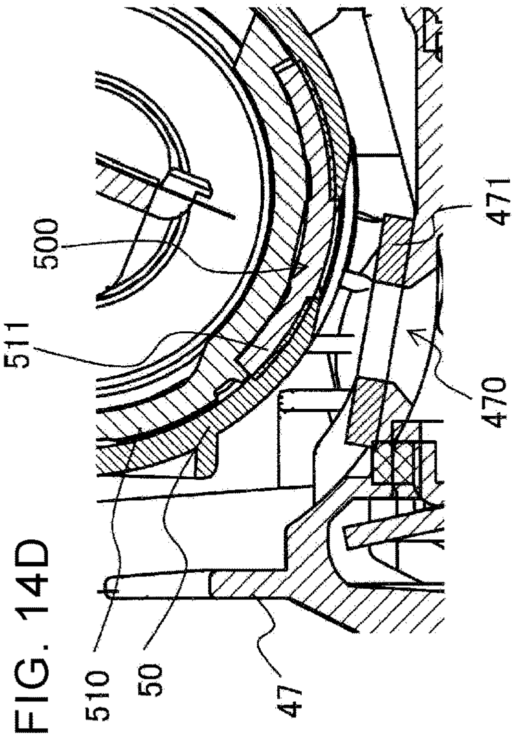

Next, the user operation for removing the developer cartridge 5 from the drum unit 4 is described below with respect to FIGS. 14A to 14D. FIGS. 14A and 14B are cross-sectional views respectively illustrating the guide rib 520L and the vicinity of the shutter 51 when the developer cartridge 5 is in the pullout start state, and FIGS. 14C and 14D are cross sectional views respectively illustrating the guide rib 520L and the vicinity of the shutter 51 when the developer cartridge 5 is in a middle of being pulled out.

When removing the developer cartridge 5 from the drum unit 4, the user operates the operation lever 53 to rotate the shutter 51 from the lock position toward the TC pullout position and to separate the developer cartridge 5 from the sealing member 471, and thus the developer cartridge 5 becomes in the state where the developer cartridge 5 can be pulled out in the pullout direction Db opposite to the insertion direction Da. When the user pulls out the developer cartridge 5 in the pullout direction Db from this state, the developer cartridge 5 moves while the developer cartridge 5 is kept apart from the sealing member 471 with the leading end side guide portion 5201L being guided by the second groove portion 4902L, and the developer cartridge 5 is removed from the drum unit 4.

(Installation of Developer Cartridge 5)

Figure 15A:
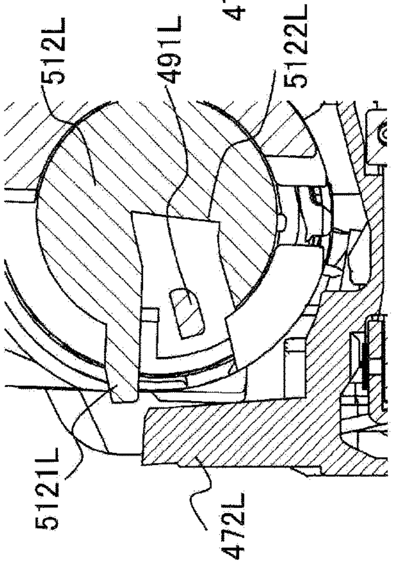
FIGS. 15A, 15B, and 15C are a side view, a cross sectional view, and a cross sectional view that respectively illustrate the lock engagement member, the shutter, and the guide rib when the developer cartridge is in a middle of being inserted.
Figure 15B:
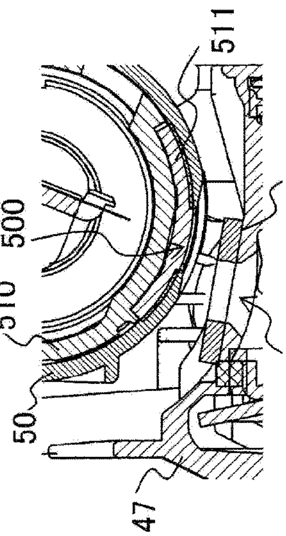
Figure 15C:
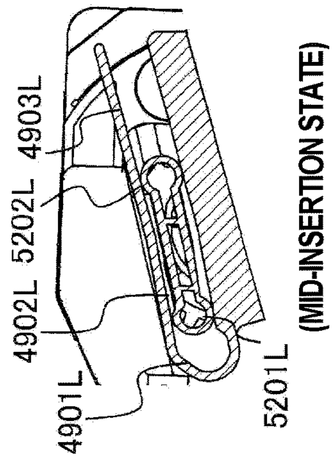
Figure 15D:
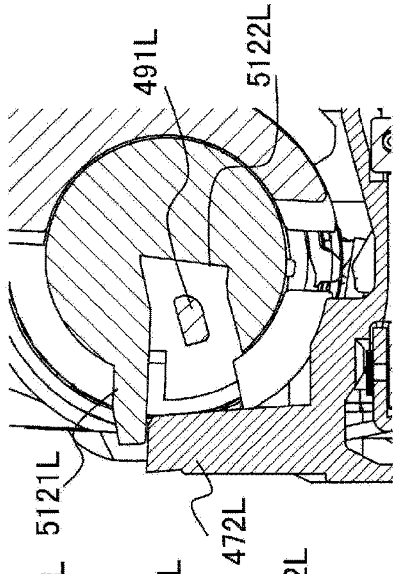
FIGS. 15D, 15E, and 15F are a side view, a cross-sectional view, and a cross-sectional view that respectively illustrate the lock engagement member, the shutter, and the guide rib when the developer cartridge is in a middle of being inserted.
Figure 15E:
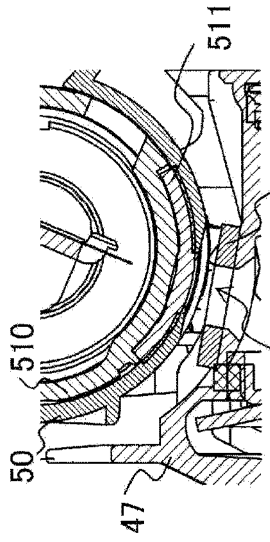
Figure 15F:
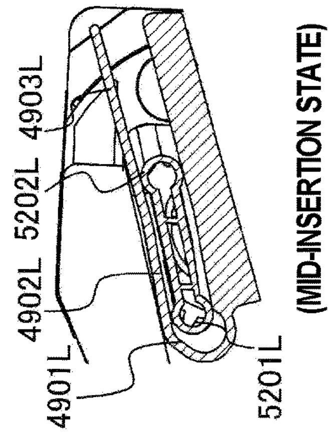
Figure 15G:
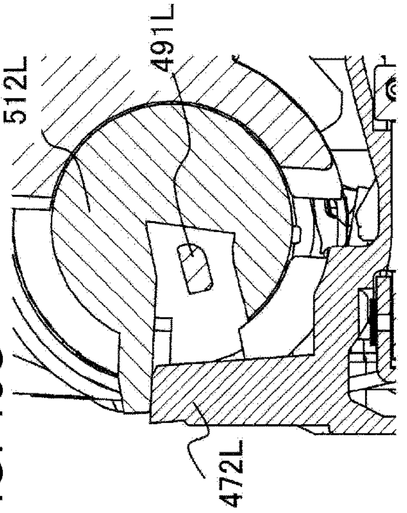
FIGS. 15G, 15H, and 15I are a side view, a cross-sectional view, and a cross-sectional view that respectively illustrate the lock engagement member, the shutter, and the guide rib when the developer cartridge is at an insertion end position (an insertion completed position)
Figure 15H:
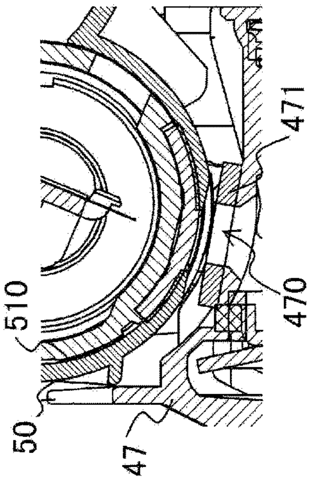
Figure 15I:
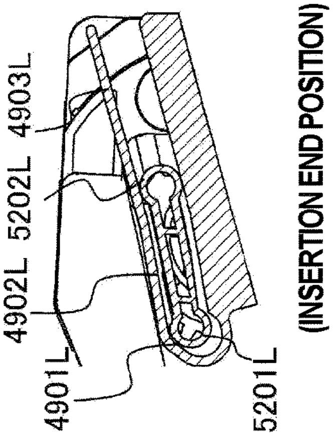

Next, an operation of installing the developer cartridge 5 to the drum unit 4 is explained with reference to FIGS. 15A to 16I. Note that in FIGS. 15A to 16I, components on the left side are only illustrated, but the components on the right side are same as the components on the left side and thus the components on the right side and the operations of the components on the right side are not illustrated or explained for avoid redundancies. FIGS. 15A, 15B, and 15C are a side view, a cross-sectional view, and a cross-sectional view respectively illustrating the lock engagement member 512L, the shutter 51, and the guide rib 520L, in a state of a middle of inserting the developer cartridge 5 into the drum unit 4. FIGS. 15D, 15E, and 15F are a side view, a cross-sectional view, and a cross-sectional view respectively illustrating the lock engagement member 512L, the shutter 51, and the guide rib 520L, in a state of a middle of inserting the developer cartridge 5 into the drum unit 4, in which the developer cartridge 5 is further inserted into the drum unit 4 from the state illustrated in FIGS. 15A, 15B, and 15C. FIGS. 15G, 15H, and 15I are a side view, a cross-sectional view, and a cross-sectional view respectively illustrating the lock engagement member 512L, the shutter 51, and the guide rib 520L, in a state where the developer cartridge 5 is at the insertion end position, in which the developer cartridge 5 is further inserted into the drum unit 4 from the state illustrated in FIGS. 15D, 15E, and 15F.

Figure 16A:
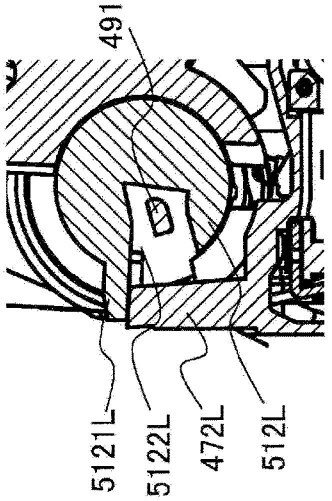
FIGS. 16A, 16B, and 16C are a side view, a cross sectional view, and a cross sectional view that respectively illustrate the lock engagement member, the shutter, and the guide rib when the developer cartridge is at the insertion end position.
Figure 16B:
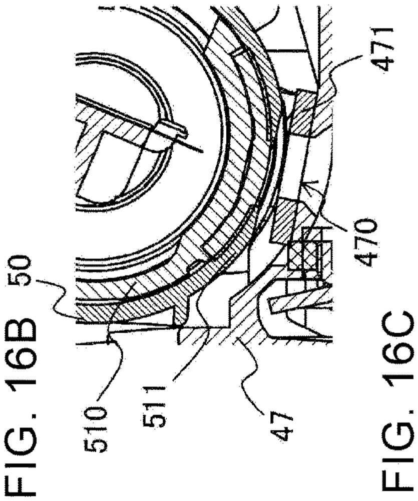
Figure 16C:
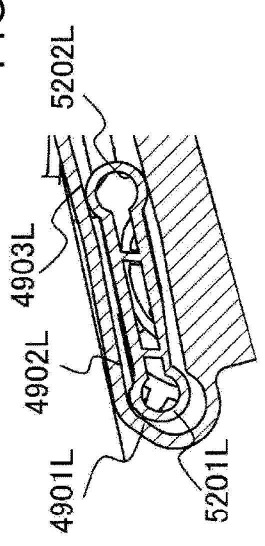
Figure 16D:
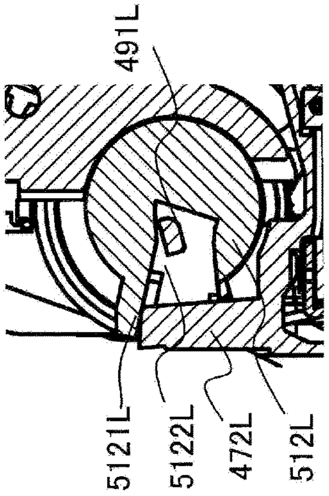
FIGS. 16D, 16E, and 16F are a side view, a cross-sectional view, and a cross-sectional view that respectively illustrate the lock engagement member, the shutter, and the guide rib when the developer cartridge is in a middle of transitioning to the locked state.
Figure 16E:
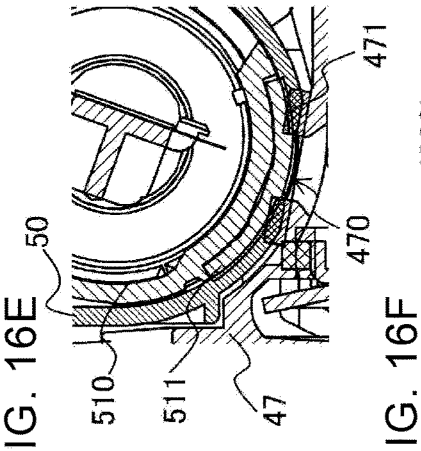
Figure 16F:
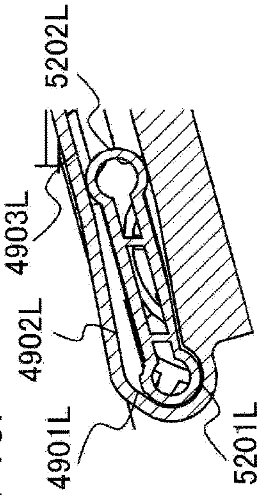
Figure 16G:
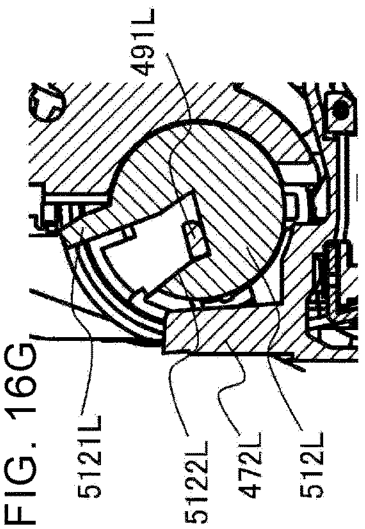
FIGS. 16G, 16H, and 16I are a side view, a cross-sectional view, and a cross-sectional view that respectively illustrate the lock engagement member, the shutter, and the guide rib when the developer cartridge is in the locked state.
Figure 16H:
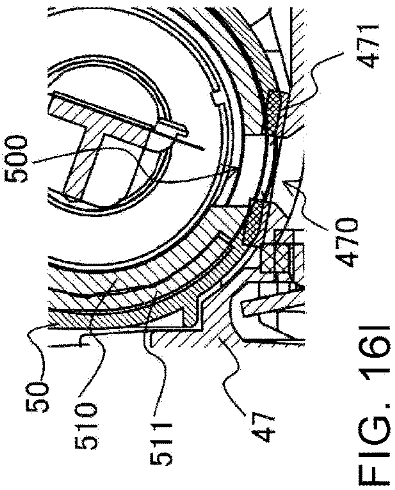
Figure 16I:
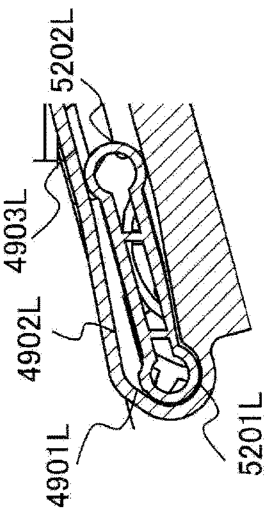

FIGS. 16A, 16B, and 16C are a side view, a cross-sectional view, and a cross-sectional view respectively illustrating the lock engagement member 512L, the shutter 51, and the guide rib 520L, when the developer cartridge 5 is at the insertion end position. FIGS. 16D, 16E, and 16F are a side view, a cross-sectional view, and a cross-sectional view respectively illustrating the lock engagement member 512L, the shutter 51, and the guide rib 520L, in a state of a middle of transitioning to the locked state where the developer cartridge 5 is in the locked state. FIGS. 16G, 16H, and 16I are a side view, a cross-sectional view, and a cross-sectional view respectively illustrating the lock engagement member 512L, the shutter 51, and the guide rib 520L, when the developer cartridge 5 is in the locked state.

When installing the developer cartridge 5 in the drum unit 4, the installation procedure is performed in the following order: (i) the state illustrated in FIGS. 15A, 15B, and 15C, (ii) the state illustrated in FIGS. 15D, 15E, and 15F, (iii) the state illustrated in FIG. 15G, 15H, 15I (the state illustrated in FIGS. 16A, 16B, and 16C), (iv) the state illustrated in FIGS. 16D, 16E, and 16F, and (v) the state illustrated in FIGS. 16G, 16H, and 16I.

First, when the user inserts the developer cartridge 5 into the drum unit 4 in the insertion direction Da, the developer cartridge 5 becomes in the mid-insertion state illustrated in FIGS. 15A, 15B, and 15C, in which the distal end side guide portion 5201L is guided by the second groove portion 4902L and the developer cartridge 5 is inserted while being separated from the sealing member 471.

When the developer cartridge 5 is further inserted in the insertion direction Da, the developer cartridge 5 gets in the mid-insertion state illustrated in FIGS. 15D, 15E, and 15F, and when the distal side guide portions 5201L reaches the second groove portion 4902L, the projection 5121L is positioned above the support portion 472L.

When the developer cartridge 5 is further inserted in the insertion direction Da, the insertion is completed as illustrated in FIGS. 15G, 15H, 15I and FIGS. 16A, 16B, and 16C, in which the leading end side guide portion 5201L comes out of the second groove portion 4902L and a lower portion of the leading end side guide portion 5201L is no longer supported. At this time, the protrusion 5121L comes into contact with the support portion 472L to prevent the developer cartridge 5 from moving downward, so that the developer cartridge 5 moves to the TC pullout position while remaining separated from the sealing member 471.

When the user operates the operation lever 53 with the developer cartridge 5 inserted in the TC pullout position, the developer cartridge 5 gets in the middle of transitioning to the locked state illustrated in FIGS. 16D, 16E, and 16F, that is, the shutter 51 is rotated in the clockwise direction, the protrusion 5121L of the lock engagement member 512L move upward with respect to the shutter 51, and the developer cartridge 5 moves downward due to the weight of the developer cartridge 5, and thus the developer cartridge 5 comes in contact with the seal member 471. At this time, the developer supply port 500 is in the closed state.

When the user operates the operation lever 53 to further rotate the shutter 51 in the clockwise direction, the developer cartridge 5 gets in the locked state illustrated in FIGS. 16G, 16H, and 16I, in which the developer supply port 500 is opened and the groove 5122L of the engagement member 512L engages with the lock engagement post 491L so that the developer cartridge 5 is fixed to the drum unit 4.

Effects

As explained above, when removing the used developer cartridge 5 from the drum unit 4, the developer cartridge 5 is separated from the sealing member 471 before the operation of pulling out the developer cartridge 5. Accordingly, during the operation of pulling the developer cartridge 5 in the pulling direction Db, the sealing member 471 is no longer rubbed by the developer cartridge 5. Therefore, it is possible to prevent the developer attached to the seal member 471 from scattering and contaminating the inside of the image formation apparatus 1.

Furthermore, when installing the developer cartridge 5 to the drum unit 4, the developer cartridge 5 is inserted to a position where the developer supply port 500 is located above the developer reception port 470 while the developer cartridge 5 and the sealing member 471 are kept separated and then moved in a downward direction (that is, in the direction toward the sealing member 471). Therefore, it is possible to prevent the seal member 471 from being rubbed against the developer cartridge 5 and thus deformed, which allows the developer cartridge 5 and the sealing member 471 to stably contact each other, unlike a configuration in which the developer cartridge 5 is inserted with the developer cartridge 5 and the seal member 471 being in contact with each other until the developer supply port 500 is positioned above the developer reception port 470.

MODIFICATIONS

Figure 17:
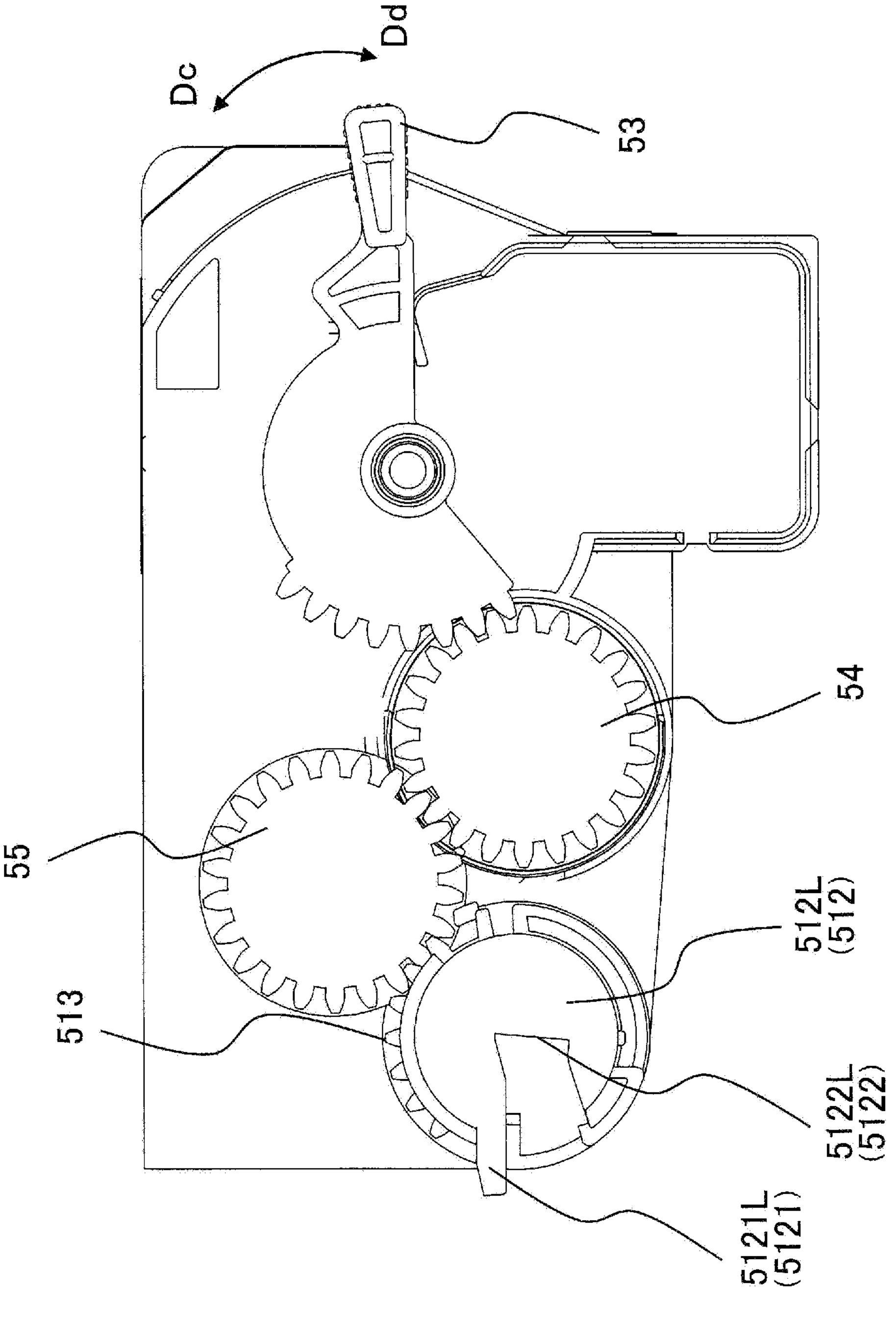
FIG. 17 is a side view illustrating the lock engagement member, an operation part, and a gear train that transmits the movement of the operation part to the lock engagement member of the developer cartridge when the shutter is in the closed state.

FIG. 17 is a diagram of a side view illustrating the lock engagement member 512L of the developer cartridge 5, the operation lever 53 serving as the operation part, and a gear train (including gears 54 and 55) that transmits the rotation movement of the operation lever 53 to the lock engagement member 512L, when the shutter 51 is in the closed state according to a modification. In an embodiment illustrated in FIGS. 1 to 16I, the lock engagement members 512 (512L, 512R) are provided integrally with the shutter 51, but in the modification illustrated in FIG. 17, the lock engagement members 512 (only the lock engagement member 512L on the left side is illustrated in FIG. 17) are members separated from the shutter 51. In the modification illustrated in FIG. 17, in conjunction with the movement of the operation lever 53, the gears 54 and 55 are rotated and thus the lock engagement members 512 are rotated. Further, in conjunction with the movement of the operation lever 53, the gear 54 is rotated and the shutter 51 connected to the gear 54 is rotated. According to the modification illustrated in FIG. 17 as well, scattering of the developer can be prevented as in an embodiment illustrated in FIGS. 1 to 16I. In the modification in which the lock engagement members 512 are separate members from the shutter 51, the stability of the operation may be inferior to the configuration illustrated in FIGS. 10A and 10B, but there is an advantage that the degree of freedom in designing the structure of the developer cartridge 5 is improved.

In the above description, the case has been described in which the image formation apparatus 1 is the monochrome printer. However, the image formation apparatus 1 may be a color printer, a copying machine, a facsimile machine, a multifunction device, or the like.

The invention includes other embodiments or modifications in addition to one or more embodiments and modifications described above without departing from the spirit of the invention. The one or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation unit comprising:

an image formation part including a developer reception port and configured to form a developer image with a developer; and a developer cartridge including: a storage section that stores therein the developer; a developer supply port provided at the storage section; a shutter movable between an open position that opens the developer supply port and a closed position that closes the developer supply port; a lock engagement member rotatably provided with respect to the storage section; and an operation part configured to be operated to move the shutter and rotate the lock engagement member, wherein the developer is supplied from the storage section to the developer reception port through the developer supply port, in a state where the developer cartridge is installed to the image formation part such that the developer supply port overlaps with the developer reception port, the developer cartridge contacts a peripheral portion of the developer reception port, and the shutter is in the open position, and when the shutter moves from the open position to the closed position in conjunction with a movement of the operation part and the lock engagement member rotates in conjunction with the movement of the operation part, the lock engagement member is engaged with the image formation part and the developer cartridge is separated from the peripheral portion of the developer reception port.

2. The image formation unit according to claim 1, wherein the lock engagement member includes a first engagement portion, the image formation part includes a support portion configured to be engaged with the first engagement portion, and when the lock engagement member rotates in conjunction with the movement of the operation part, the first engagement portion is engaged with the support portion and the developer cartridge is separated from the peripheral portion.

3. The image formation unit according to claim 2, wherein the first engagement portion comprises a protrusion.

4. The image formation unit according to claim 1, wherein the lock engagement member includes a second engagement portion, the image formation part includes a third engagement portion configured to be engaged with the second engagement portion, and when the lock engagement member rotates in conjunction with the movement of the operation part, the second engagement portion is engaged with the third engagement portion and the developer cartridge contacts the peripheral portion.

5. The image formation unit according to claim 4, wherein the second engagement portion comprises a groove.

6. The image formation unit according to claim 1, wherein the image formation part includes a guide portion configured to guide the developer cartridge, and the guide portion includes a first groove portion configured to guide the developer cartridge in a separation direction in which the developer supply port and the developer reception port are separated from each other.

7. The image formation unit according to claim 6, wherein the guide portion includes a second groove portion configured to guide the developer cartridge in a first pullout direction different from the separation direction.

8. The image formation unit according to claim 7, wherein the guide portion includes a third groove portion configured to guide the developer cartridge in a second pullout direction different from the separation direction, wherein the second pullout direction is steeper than the first pullout direction.

9. The image formation unit according to claim 1, wherein the lock engagement member is provided at the shutter.

10. The image formation unit according to claim 1, wherein the lock engagement member is provided as a separate member from the shutter.

11. The image formation unit according to claim 1, wherein the developer cartridge is configured, in conjunction with the rotation of the lock engagement member, to move away from the developer reception port after the developer supply port is closed by the shutter.

12. An image formation apparatus comprising:

the image formation unit according to claim 1.

13. An image formation apparatus comprising:

the image formation unit according to claim 1;

a transfer member configured to transfer the developer image formed by the image formation unit to a medium; and a fixation device configured to fix the developer image to the medium.

* * * * *